(12) United States Patent
Manolakos et al.

(10) Patent No.: US 12,355,697 B2
(45) Date of Patent: Jul. 8, 2025

(54) REFERENCE SIGNAL TRANSMISSION OMISSION AND POSTPONING

(71) Applicant: QUALCOMM INCORPORATED, San Diego, CA (US)

(72) Inventors: Alexandros Manolakos, Escondido, CA (US); Muhammad Sayed Khairy Abdelghaffar, San Jose, CA (US); Gokul Sridharan, Sunnyvale, CA (US); Runxin Wang, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/797,392

(22) PCT Filed: Apr. 2, 2020

(86) PCT No.: PCT/CN2020/082891
§ 371 (c)(1),
(2) Date: Aug. 3, 2022

(87) PCT Pub. No.: WO2021/196109
PCT Pub. Date: Oct. 7, 2021

(65) Prior Publication Data
US 2023/0079945 A1 Mar. 16, 2023

(51) Int. Cl.
*H04L 5/00* (2006.01)
*H04L 1/08* (2006.01)

(52) U.S. Cl.
CPC .............. *H04L 5/0051* (2013.01); *H04L 1/08* (2013.01)

(58) Field of Classification Search
CPC ................................ H04L 5/0051; H04L 1/08
See application file for complete search history.

(56) References Cited

U.S. PATENT DOCUMENTS

| 2010/0177746 A1 | 7/2010 | Gorokhov et al. |
| 2013/0229989 A1 | 9/2013 | Natarajan et al. |

(Continued)

FOREIGN PATENT DOCUMENTS

| CN | 107809305 A | 3/2018 |
| CN | 110099446 A | 8/2019 |

OTHER PUBLICATIONS

International Search Report and Written Opinion—PCT/CN2020/082891—ISA/EPO—Dec. 30, 2020.

(Continued)

*Primary Examiner* — Derrick V Rose
(74) *Attorney, Agent, or Firm* — Holland & Hart LLP

(57) ABSTRACT

Methods, systems, and devices for wireless communications are described. A user equipment (UE) may receive a configuration signal configuring a collection of reference signal transmissions. The UE may identify a resource overlap between the collection of reference signal transmissions and another resource that is unavailable for reference signal transmissions. The UE may identify one or more transmission properties for the collection of reference signal transmissions. The UE may determine, based at least in part on the one or more transmission properties and the resource overlap, whether to omit one or more of the reference signal transmissions of the collection of reference signal transmissions in the corresponding resource overlap or to delay transmission of the collection of reference signal transmissions. The UE may transmit at least a portion of the collection of reference signal transmissions based at least in part on the determining.

35 Claims, 17 Drawing Sheets

(56) References Cited

U.S. PATENT DOCUMENTS

| | | |
|---|---|---|
| 2019/0089498 A1 | 3/2019 | Pelletier et al. |
| 2019/0254088 A1 | 8/2019 | Park et al. |
| 2019/0261327 A1 | 8/2019 | Hosseini et al. |
| 2019/0261338 A1 | 8/2019 | Akkarakaran et al. |
| 2019/0288808 A1* | 9/2019 | Baldemair ............ H04W 72/21 |
| 2020/0008220 A1* | 1/2020 | Lee ........................ H04W 74/02 |
| 2022/0210803 A1* | 6/2022 | Liu ........................... H04L 1/08 |
| 2022/0330300 A1* | 10/2022 | Wang ................ H04L 27/26025 |
| 2024/0031097 A1* | 1/2024 | Go ........................ H04L 5/0094 |

OTHER PUBLICATIONS

LG Electronics: "Remaining Issues on UL Data Transmission Procedure," 3GPP TSG RAN WG1 Meeting #92bis, R1-1804560, Apr. 16-20, 2018 (Apr. 20, 2018), 6 pages, the whole document.
Supplementary European Search Report—EP20929222—Search Authority—The Hague—Nov. 20, 2023.

\* cited by examiner

REFERENCE SIGNAL TRANSMISSION OMISSION AND POSTPONING

CROSS REFERENCE

The present Application is a 371 national stage filing of International PCT Application No. PCT/CN2020/082891 by MANOLAKOS et al. entitled "REFERENCE SIGNAL TRANSMISSION OMISSION AND POSTPONING," filed Apr. 2, 2020, which is assigned to the assignee hereof, and which is expressly incorporated by reference in its entirety herein.

FIELD OF TECHNOLOGY

The following relates generally to wireless communications and more specifically to reference signal transmission omission and postponing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support reference signal transmission omission and postponing. Generally, the described techniques provide various mechanisms to determine whether one or more conflicting reference signal transmissions are to be omitted or postponed. For example, a base station may configure the user equipment (UE) with a collection of reference signal transmissions (e.g., aperiodic sounding reference signal (SRS) resource configuration configured via radio resource control (RRC) signaling). The base station and/or UE may determine that there is a resource overlap with respect to one or more of the reference signal transmissions in the collection of reference signal transmissions. For example, the base station and/or UE may determine that one or more symbols in the collection of reference signal transmissions are configured for a downlink transmission, or flexible transmission, are allocated to another uplink channel having a higher priority than the reference signal transmission(s), are allocated as guard symbols, are allocated for a measurement gap/radio frequency (RF) retuning gap, and/or are otherwise configured as unavailable through implicit and/or explicit signaling.

The UE and/or base station may then identify one or more transmission properties for the collection of reference signal transmissions. Examples of the transmission properties for the reference signal transmissions may include, but are not limited to, the length of the collection of reference signal transmissions, a ratio of the resource overlap for the collection of reference signal transmissions, a use for the collection of reference signal transmissions, a location of the resource overlap within the collection of reference signal transmissions, a staggering configuration for the collection of reference signal transmissions, and/or a repetition configuration for the collection of reference signal transmissions. The base station and/or UE (e.g., in order to ensure consistency between the devices) may consider the resource overlap and transmission properties when determining whether to omit one or more of the reference signal transmissions occurring in the corresponding resource overlap or to delay transmission of the collection of reference signal transmissions (e.g., to a later slot). The transmission properties and/or nature of the resource overlap may be considered individually, collectively, or in any combination, when determining whether to omit the conflicting reference signal transmissions or to delay transmitting the collection of reference signal transmissions. Accordingly, the UE may transmit (and the base station may receive) at least a portion of the collection of reference signal transmissions based on the omission/delay determination. For example, the UE may transmit the non-omitted reference signal transmission(s) during the configured slot or may delay transmitting all of the collection of reference signal transmissions until a later slot.

A method of wireless communication at a UE is described. The method may include receiving a configuration signal configuring a collection of reference signal transmissions, identifying a resource overlap between the collection of reference signal transmissions and another resource that is unavailable for reference signal transmissions, identifying one or more transmission properties for the collection of reference signal transmissions, determining, based on the one or more transmission properties and the resource overlap, whether to omit one or more of the reference signal transmissions of the collection of reference signal transmissions in the corresponding resource overlap or to delay transmission of the collection of reference signal transmissions, and transmitting at least a portion of the collection of reference signal transmissions based on the determining.

An apparatus for wireless communication at a UE is described. The apparatus may include a processor, memory coupled with the processor, and instructions stored in the memory. The instructions may be executable by the processor to cause the apparatus to receive a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether to omit one or more of the reference signal transmissions of the collection of reference signal transmissions in the corresponding resource overlap or to delay transmission of the collection of reference signal transmissions, and transmit at least a portion of the collection of reference signal transmissions based on the determining.

Another apparatus for wireless communication at a UE is described. The apparatus may include means for receiving a configuration signal configuring a collection of reference signal transmissions, identifying a resource overlap between the collection of reference signal transmissions and another resource that is unavailable for reference signal transmissions, identifying one or more transmission properties for the collection of reference signal transmissions, determining, based on the one or more transmission properties and the resource overlap, whether to omit one or more of the reference signal transmissions of the collection of reference signal transmissions in the corresponding resource overlap or to delay transmission of the collection of reference signal transmissions, and transmitting at least a portion of the collection of reference signal transmissions based on the determining.

A non-transitory computer-readable medium storing code for wireless communication at a UE is described. The code may include instructions executable by a processor to receive a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether to omit one or more of the reference signal transmissions of the collection of reference signal transmissions in the corresponding resource overlap or to delay transmission of the collection of reference signal transmissions, and transmit at least a portion of the collection of reference signal transmissions based on the determining.

Some examples of the method, apparatuses, and non-transitory computer-readable medium described herein may further include operations, features, means, or instructions for identifying a length of the collection of reference signal transmissions, where the one or more transmission properties include the length of the collection of reference signal transmissions.

Some examples of the method, apparatuses, and non-transitory computer-readable medium described herein may further include operations, features, means, or instructions for identifying, based on the configuration signal, a number of symbols configured for reference signal transmissions, determining that the number of symbols configured for reference signal transmissions may be less than a threshold, and determining to delay transmission of the collection of reference signal transmissions based on the number of symbols being less than the threshold.

Some examples of the method, apparatuses, and non-transitory computer-readable medium described herein may further include operations, features, means, or instructions for receiving an indication of the threshold for the number of symbols.

Some examples of the method, apparatuses, and non-transitory computer-readable medium described herein may further include operations, features, means, or instructions for identifying a ratio of a first length of the resource overlap over a second length of the collection of reference signal transmissions, where the one or more transmission properties include the ratio of resource overlap.

Some examples of the method, apparatuses, and non-transitory computer-readable medium described herein may further include operations, features, means, or instructions for identifying, based on the configuration signal, a number of symbols configured for reference signal transmissions, where the number of symbols include the second length, and identifying, based on the resource overlap, a number of unavailable symbols within the symbols configured for reference signal transmissions, where the number of unavailable symbols include the first length.

Some examples of the method, apparatuses, and non-transitory computer-readable medium described herein may further include operations, features, means, or instructions for determining that the number of symbols configured for reference signal transmissions may be less than a first threshold, and determining to delay transmission of the collection of reference signal transmissions based on the number of symbols being less than the first threshold and the number of unavailable symbols.

Some examples of the method, apparatuses, and non-transitory computer-readable medium described herein may further include operations, features, means, or instructions for receiving an indication of the first threshold for the number of symbols.

Some examples of the method, apparatuses, and non-transitory computer-readable medium described herein may further include operations, features, means, or instructions for determining that the number of symbols configured for reference signal transmissions satisfies a first threshold, determining that the number of unavailable symbols may be less than a second threshold, and determining to omit the reference signal transmissions in the corresponding resource overlap based on the number of symbols satisfying the first threshold and the number of unavailable symbols being less than the second threshold.

Some examples of the method, apparatuses, and non-transitory computer-readable medium described herein may further include operations, features, means, or instructions for receiving an indication of the first threshold for the number of symbols and the second threshold for the unavailable symbols.

Some examples of the method, apparatuses, and non-transitory computer-readable medium described herein may further include operations, features, means, or instructions for identifying a use for the collection of reference signal transmissions, where the one or more transmission properties include the use for the collection of reference signal transmissions.

Some examples of the method, apparatuses, and non-transitory computer-readable medium described herein may further include operations, features, means, or instructions for determining that the reference signal transmissions include positioning reference signal transmissions, and determining to delay transmission of the collection of reference signal transmissions based on the reference signal transmissions including positioning reference signal transmissions.

Some examples of the method, apparatuses, and non-transitory computer-readable medium described herein may further include operations, features, means, or instructions for identifying a location of the resource overlap within the collection of reference signal transmissions, where the one or more transmission properties include the location of the resource overlap within the collection of reference signal transmissions.

In some examples of the method, apparatuses, and non-transitory computer-readable medium described herein, identifying the location of the resource overlap may include operations, features, means, or instructions for determining that the resource overlap occurs between a first set of symbols and a second set of symbols configured for reference signal transmissions, and determining to delay transmission of the collection of reference signal transmissions based on the resource overlap occurring between the first set of symbols and the second set of symbols.

In some examples of the method, apparatuses, and non-transitory computer-readable medium described herein, identifying the location of the resource overlap may include operations, features, means, or instructions for determining that the resource overlap occurs either during a beginning symbol or an ending symbol configured for reference signal transmissions, and determining to omit the reference signal transmissions in the corresponding resource overlap based on the resource overlap occurring either during the beginning symbol or the ending symbol.

Some examples of the method, apparatuses, and non-transitory computer-readable medium described herein may further include operations, features, means, or instructions for identifying a staggering configuration for the collection of reference signal transmissions, where the one or more transmission properties include the staggering configuration for the collection of reference signal transmissions.

In some examples of the method, apparatuses, and non-transitory computer-readable medium described herein, identifying the staggering configuration may include operations, features, means, or instructions for determining that the collection of reference signal transmissions may be configured for staggering transmissions, and determining to delay transmission of the collection of reference signal transmissions based on the staggering transmissions.

In some examples of the method, apparatuses, and non-transitory computer-readable medium described herein, identifying the staggering configuration may include operations, features, means, or instructions for determining that the collection of reference signal transmissions may be configured for non-staggering transmissions, and determining to omit the reference signal transmissions in the corresponding resource overlap based on the non-staggering transmissions.

Some examples of the method, apparatuses, and non-transitory computer-readable medium described herein may further include operations, features, means, or instructions for identifying a repetition configuration for the collection of reference signal transmissions, where the one or more transmission properties include the repetition configuration for the collection of reference signal transmissions.

In some examples of the method, apparatuses, and non-transitory computer-readable medium described herein, identifying the repetition configuration may include operations, features, means, or instructions for determining that the collection of reference signal transmissions may be configured for repetition transmissions across a set of slots, and determining to omit the reference signal transmissions in the corresponding resource overlap based on the repetition transmissions.

In some examples of the method, apparatuses, and non-transitory computer-readable medium described herein, identifying the repetition configuration may include operations, features, means, or instructions for determining that the collection of reference signal transmissions may be configured for non-repetition transmissions, and determining whether to omit the reference signal transmissions in the corresponding resource overlap or to delay transmission of the collection of reference signal transmissions based on the non-repetition transmissions.

In some examples of the method, apparatuses, and non-transitory computer-readable medium described herein, identifying one or more transmission properties may include operations, features, means, or instructions for identifying at least one of a length of the collection of reference signal transmissions, or a ratio of resource overlap for the collection of reference signal transmissions, or a use for the collection of reference signal transmissions, or a location of the resource overlap within the collection of reference signal transmissions, or a staggering configuration for the collection of reference signal transmissions, or a repetition configuration for the collection of reference signal transmissions, or any combination thereof.

Some examples of the method, apparatuses, and non-transitory computer-readable medium described herein may further include operations, features, means, or instructions for receiving an indication of at least one of the one or more transmission properties, one or more thresholds associated with the one or more transmission properties, or a combination thereof.

In some examples of the method, apparatuses, and non-transitory computer-readable medium described herein, the collection of reference signal transmissions include a SRS resource having a repetition factor of R, where R includes a number of reference signal transmissions within consecutive symbols.

A method of wireless communication at a base station is described. The method may include transmitting, to a UE, a configuration signal configuring a collection of reference signal transmissions, identifying a resource overlap between the collection of reference signal transmissions and another resource that is unavailable for reference signal transmissions, identifying one or more transmission properties for the collection of reference signal transmissions, determining, based on the one or more transmission properties and the resource overlap, whether one or more of the reference signal transmissions of the collection of reference signal transmissions in the corresponding resource overlap are omitted or the transmission of the collection of reference signal transmissions is delayed, and receiving at least a portion of the collection of reference signal transmissions based on the determining.

An apparatus for wireless communication at a base station is described. The apparatus may include a processor, memory coupled with the processor, and instructions stored in the memory. The instructions may be executable by the processor to cause the apparatus to transmit, to a UE, a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether one or more of the reference signal transmissions of the collection of reference signal transmissions in the corresponding resource overlap are omitted or the transmission of the collection of reference signal transmissions is delayed, and receive at least a portion of the collection of reference signal transmissions based on the determining.

Another apparatus for wireless communication at a base station is described. The apparatus may include means for transmitting, to a UE, a configuration signal configuring a collection of reference signal transmissions, identifying a resource overlap between the collection of reference signal transmissions and another resource that is unavailable for reference signal transmissions, identifying one or more transmission properties for the collection of reference signal transmissions, determining, based on the one or more transmission properties and the resource overlap, whether one or more of the reference signal transmissions of the collection of reference signal transmissions in the corresponding resource overlap are omitted or the transmission of the collection of reference signal transmissions is delayed, and receiving at least a portion of the collection of reference signal transmissions based on the determining.

A non-transitory computer-readable medium storing code for wireless communication at a base station is described. The code may include instructions executable by a processor to transmit, to a UE, a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether one or more of the reference signal transmissions of the collection of reference signal transmissions in the corresponding resource overlap are omitted or the transmission of the collection of reference signal transmissions is delayed, and receive at least a portion of the collection of reference signal transmissions based on the determining.

Some examples of the method, apparatuses, and non-transitory computer-readable medium described herein may further include operations, features, means, or instructions for identifying a length of the collection of reference signal transmissions, where the one or more transmission properties include the length of the collection of reference signal transmissions.

Some examples of the method, apparatuses, and non-transitory computer-readable medium described herein may further include operations, features, means, or instructions for identifying, based on the configuration signal, a number of symbols configured for reference signal transmissions, determining that the number of symbols configured for reference signal transmissions may be less than a threshold, and determining that the transmission of the collection of reference signal transmissions may be delayed based on the number of symbols being less than the threshold.

Some examples of the method, apparatuses, and non-transitory computer-readable medium described herein may further include operations, features, means, or instructions for transmitting an indication of the threshold for the number of symbols.

Some examples of the method, apparatuses, and non-transitory computer-readable medium described herein may further include operations, features, means, or instructions for identifying a ratio of a first length of the resource overlap over a second length of the collection of reference signal transmissions, where the one or more transmission properties include the ratio of resource overlap.

Some examples of the method, apparatuses, and non-transitory computer-readable medium described herein may further include operations, features, means, or instructions for identifying, based on the configuration signal, a number of symbols configured for reference signal transmissions, where the number of symbols include the second length, and identifying, based on the resource overlap, a number of unavailable symbols within the symbols configured for reference signal transmissions, where the number of unavailable symbols include the first length.

Some examples of the method, apparatuses, and non-transitory computer-readable medium described herein may further include operations, features, means, or instructions for determining that the number of symbols configured for reference signal transmissions may be less than a first threshold, and determining that transmission of the collection of reference signal transmissions may be delayed based on the number of symbols being less than the first threshold and the number of unavailable symbols.

Some examples of the method, apparatuses, and non-transitory computer-readable medium described herein may further include operations, features, means, or instructions for transmitting an indication of the first threshold for the number of symbols.

Some examples of the method, apparatuses, and non-transitory computer-readable medium described herein may further include operations, features, means, or instructions for determining that the number of symbols configured for reference signal transmissions satisfies a first threshold, determining that the number of unavailable symbols may be less than a second threshold, and determining that the reference signal transmissions in the corresponding resource overlap may be omitted based on the number of symbols satisfying the first threshold and the number of unavailable symbols being less than the second threshold.

Some examples of the method, apparatuses, and non-transitory computer-readable medium described herein may further include operations, features, means, or instructions for transmitting an indication of the first threshold for the number of symbols and the second threshold for the unavailable symbols.

Some examples of the method, apparatuses, and non-transitory computer-readable medium described herein may further include operations, features, means, or instructions for identifying a use for the collection of reference signal transmissions, where the one or more transmission properties include the use for the collection of reference signal transmissions.

Some examples of the method, apparatuses, and non-transitory computer-readable medium described herein may further include operations, features, means, or instructions for determining that the reference signal transmissions include positioning reference signal transmissions, and determining that transmission of the collection of reference signal transmissions may be delayed based on the reference signal transmissions including positioning reference signal transmissions.

Some examples of the method, apparatuses, and non-transitory computer-readable medium described herein may further include operations, features, means, or instructions for identifying a location of the resource overlap within the collection of reference signal transmissions, where the one or more transmission properties include the location of the resource overlap within the collection of reference signal transmissions.

In some examples of the method, apparatuses, and non-transitory computer-readable medium described herein, identifying the location of the resource overlap may include operations, features, means, or instructions for determining that the resource overlap occurs between a first set of symbols and a second set of symbols configured for reference signal transmissions, and determining that transmission of the collection of reference signal transmissions may be delayed based on the resource overlap occurring between the first set of symbols and the second set of symbols.

In some examples of the method, apparatuses, and non-transitory computer-readable medium described herein, identifying the location of the resource overlap may include operations, features, means, or instructions for determining that the resource overlap occurs either during a beginning symbol or an ending symbol configured for reference signal transmissions, and determining that the reference signal transmissions in the corresponding resource overlap may be omitted based on the resource overlap occurring either during the beginning symbol or the ending symbol.

Some examples of the method, apparatuses, and non-transitory computer-readable medium described herein may further include operations, features, means, or instructions for identifying a staggering configuration for the collection of reference signal transmissions, where the one or more transmission properties include the staggering configuration for the collection of reference signal transmissions.

In some examples of the method, apparatuses, and non-transitory computer-readable medium described herein, identifying the staggering configuration may include operations, features, means, or instructions for determining that the collection of reference signal transmissions may be configured for staggering transmissions, and determining that transmission of the collection of reference signal transmissions may be delayed based on the staggering transmissions.

In some examples of the method, apparatuses, and non-transitory computer-readable medium described herein, identifying the staggering configuration may include operations, features, means, or instructions for determining that the collection of reference signal transmissions may be configured for non-staggering transmissions, and determining that the reference signal transmissions in the corresponding resource overlap may be omitted based on the non-staggering transmissions.

Some examples of the method, apparatuses, and non-transitory computer-readable medium described herein may further include operations, features, means, or instructions for identifying a repetition configuration for the collection of reference signal transmissions, where the one or more transmission properties include the repetition configuration for the collection of reference signal transmissions.

In some examples of the method, apparatuses, and non-transitory computer-readable medium described herein, identifying the repetition configuration may include operations, features, means, or instructions for determining that the collection of reference signal transmissions may be configured for repetition transmissions across a set of slots, and determining that the reference signal transmissions in the corresponding resource overlap may be omitted based on the repetition transmissions.

In some examples of the method, apparatuses, and non-transitory computer-readable medium described herein, identifying the repetition configuration may include operations, features, means, or instructions for determining that the collection of reference signal transmissions may be configured for non-repetition transmissions, and determining whether the reference signal transmissions in the corresponding resource overlap may be omitted or the transmission of the collection of reference signal transmissions may be delayed based on the non-repetition transmissions.

In some examples of the method, apparatuses, and non-transitory computer-readable medium described herein, identifying one or more transmission properties may include operations, features, means, or instructions for identifying at least one of a length of the collection of reference signal transmissions, or a ratio of resource overlap for the collection of reference signal transmissions, or a use for the collection of reference signal transmissions, or a location of the resource overlap within the collection of reference signal transmissions, or a staggering configuration for the collection of reference signal transmissions, or a repetition configuration for the collection of reference signal transmissions, or any combination thereof.

Some examples of the method, apparatuses, and non-transitory computer-readable medium described herein may further include operations, features, means, or instructions for transmitting an indication of the one or more transmission properties, one or more thresholds associated with the one or more transmission properties, or a combination thereof.

In some examples of the method, apparatuses, and non-transitory computer-readable medium described herein, the collection of reference signal transmissions include a SRS resource having a repetition factor of R, where R includes a number of reference signal transmissions within consecutive symbols.

DETAILED DESCRIPTION

Figure 1:
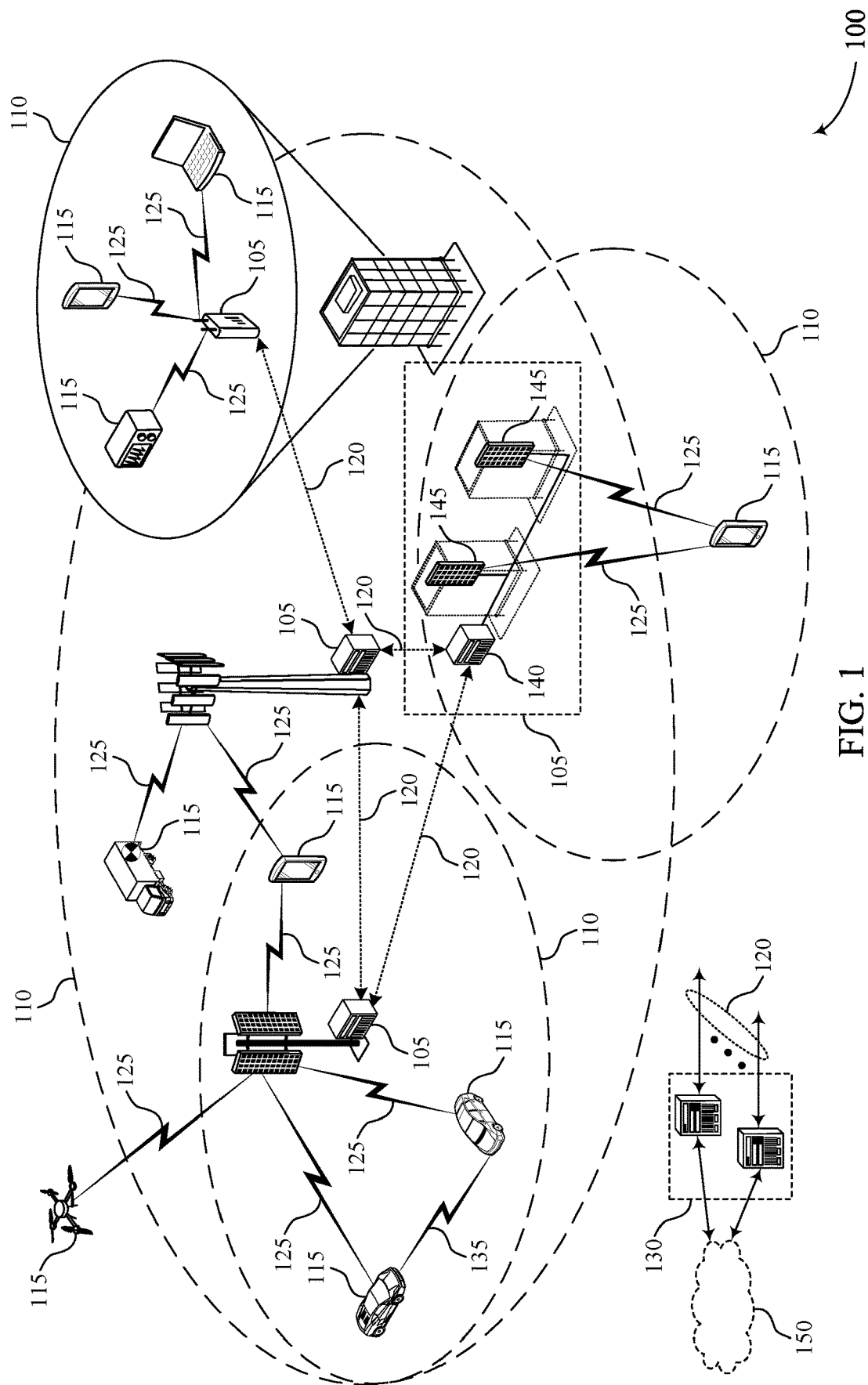
FIG. 1 illustrates an example of a system for wireless communications that supports reference signal transmission omission and postponing in accordance with aspects of the present disclosure.

Wireless communication systems may utilize reference signals transmitted by a user equipment (UE) and/or base station for a variety of purposes. One example of such reference signals includes sounding reference signals (SRS). An SRS resource set (e.g., a collection of reference signal transmissions) may include a set of SRS resources transmitted by one UE. An SRS resource set may be transmitted aperiodically (e.g., downlink control information (DCI) signaled), semi-persistently (e.g., radio resource control (RRC) signaled), or periodically (e.g., also RRC signaled). A UE may be configured with multiple resources, which may be grouped into a SRS resource set depending on the use case (e.g., antenna switching, codebook-based, non-codebook-based, beam management, etc.). However, in some situations one or more of the resources in the SRS resource set (e.g., at least one reference signal transmission within a collection a reference signal transmissions) may be conflicted out, or otherwise unavailable for the UE to perform the reference signal transmission. While there are no definitive rules established to address the situation, a general approach adopted in some wireless communication systems may simply prioritize aperiodic SRS over semi-persistent SRS, and semi-persistent SRS over periodic SRS. However, this approach limits the availability of the UE and/or base station to utilize the configured SRS resource set, which results in considerable resource waste and miscommunications between the base station and UE (e.g., the UE and base station may be out of sync with regards to which reference signals are actually transmitted).

Aspects of the disclosure are initially described in the context of wireless communications systems. Generally, the described techniques provide various mechanisms to determine whether one or more conflicting reference signal transmissions are to be omitted or postponed. For example, a base station may configure the UE with a collection of reference signal transmissions (e.g., aperiodic SRS resource configuration configured via RRC signaling). The base station and/or UE may determine that there is a resource overlap with respect to one or more of the reference signal transmissions in the collection of reference signal transmissions. For example, the base station and/or UE may determine that one or more symbols in the collection of reference signal transmissions are configured for a downlink or flexible transmission, are allocated to another uplink channel having a higher priority than the reference signal transmission(s), are allocated as guard symbols, are allocated for a measurement gap/radio frequency (RF) retuning gap, and/or are otherwise configured as unavailable through implicit and/or explicit signaling.

The UE and/or base station may then identify one or more transmission properties for the collection of reference signal transmissions. Examples of the transmission properties for the reference signal transmissions may include, but are not limited to, the length of the collection of reference signal transmissions, a ratio of the resource overlap for the collection of reference signal transmissions, a use for the collection of reference signal transmissions, a location of the resource overlap within the collection of reference signal transmissions, a staggering configuration for the collection of reference signal transmissions, and/or a repetition configuration for the collection of reference signal transmissions. The base station and/or UE (e.g., in order to ensure consistency between the devices) may consider the resource overlap and transmission properties when determining whether to omit one or more of the reference signal transmissions occurring in the corresponding resource overlap or to delay transmission of the collection of reference signal transmissions (e.g., to a later slot). The transmission properties and/or nature of the resource overlap may be considered individually, collectively, or in any combination, when determining whether to omit the conflicting reference signal transmissions or to delay transmitting the collection of reference signal transmissions. Accordingly, the UE may transmit (and the base station may receive) at least a portion of the collection of reference signal transmissions based on the omission/delay determination. For example, the UE may transmit the non-omitted reference signal transmission(s) during the configured slot or may delay transmitting all of the collection of reference signal transmissions until a later slot.

Aspects of the disclosure are further illustrated by and described with reference to apparatus diagrams, system diagrams, and flowcharts that relate to reference signal transmission omission and postponing.

FIG. 1 illustrates an example of a wireless communications system 100 that supports reference signal transmission omission and postponing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration signal configuring a collection of reference signal transmissions. The UE 115 may identify a resource overlap between the collection of reference signal transmissions and another resource that is unavailable for reference signal transmissions. The UE 115 may identify one or more transmission properties for the collection of reference signal transmissions. The UE 115 may determine, based at least in part on the one or more transmission properties and the resource overlap, whether to omit one or more of the reference signal transmissions of the collection of reference signal transmissions in the corresponding resource overlap or to delay transmission of the collection of reference signal transmissions. The UE 115 may transmit at least a portion of the collection of reference signal transmissions based at least in part on the determining.

A base station 105 may transmit, to a UE 115, a configuration signal configuring a collection of reference signal transmissions. The base station 105 may identify a resource overlap between the collection of reference signal transmissions and another resource that is unavailable for reference signal transmissions. The base station 105 may identify one or more transmission properties for the collection of reference signal transmissions. The base station 105 may determine, based at least in part on the one or more transmission properties and the resource overlap, whether one or more of the reference signal transmissions of the collection of reference signal transmissions in the corresponding resource overlap are omitted or the transmission of the collection of reference signal transmissions is delayed. The base station 105 may receive at least a portion of the collection of reference signal transmissions based at least in part on the determining.

Figure 2:
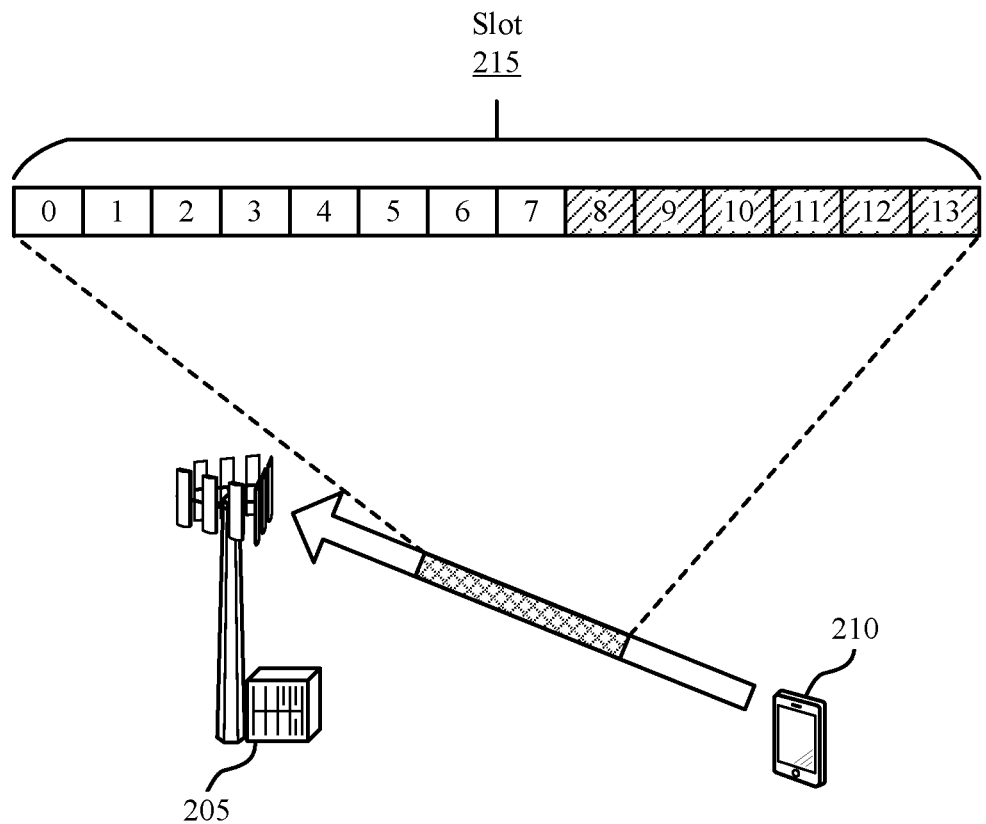
FIG. 2 illustrates an example of a wireless communication system that supports reference signal transmission omission and postponing in accordance with aspects of the present disclosure.
Figure 2:

FIG. 2 illustrates an example of a wireless communication system 200 that supports reference signal transmission omission and postponing in accordance with aspects of the present disclosure. In some examples, wireless communication system 200 may implement aspects of wireless communication system 100. Wireless communication system 200 may include base station 205 and UE 210, which may be examples of corresponding devices described herein. In some aspects, wireless communication system 200 may be an example of an NR/5G wireless communication system.

Wireless communication system 200 may support configured SRS resources (e.g., resources allocated for an SRS burst within a slot) that span one, two, or four adjacent symbols with a slot, with up to four ports per SRS resource. All ports of the SRS resource may be sounded in each symbol. An SRS transmission may occur in the last six symbols of the slot, such as slot 215 in which symbols 8 through 13 are SRS transmission opportunities 220. SRS transmissions are typically transmitted after the uplink data channel (e.g., PUSCH) in the slot. An SRS resource set may include a set of SRS resources transmitted by one UE, such as UE 210. An SRS resource set may be transmitted aperiodically (e.g., via a DCI signal), semi-persistently, or periodically. The UE may be configured with multiple SRS resources, which may be grouped in a SRS resource set depending on the use case (e.g., antenna switching, codebook based vs. non-codebook based, beam management, etc.). SRS transmissions may be wideband/subband configured. For example, an SRS bandwidth may be a multiple of four physical resource blocks (PRBs).

In some aspects, handling of the collision of two aperiodic SRS resource sets may be implementation specific, e.g., there are no rules established as to how to handle this situation. With regards to other SRS configurations, an aperiodic SRS resource set is typically afforded a higher priority than the semi-persistent SRS resource set, which is afforded a higher priority than a periodic SRS resource set. As one example, in the situation where an SRS resource with the SRS resource type set to aperiodic is triggered on an OFDM symbol that is also configured with a periodic/semi-persistent SRS transmission, the UE may transmit the aperiodic SRS resource and not transmit the periodic/semi-persistent SRS resource(s) overlapping within the symbol(s). As another example, in the situation where an SRS resource with the SRS resource type set as semi-persistent is triggered on an OFDM symbol configured with a periodic SRS transmission, the UE may transmit the semi-persistent SRS resource and not transmit the periodic SRS resource(s) overlapping within the symbol(s).

Triggering of an aperiodic SRS resource may utilize two bits in the DCI, with each configured aperiodic SRS resource set being tagged as either a "1", or "2", or "3" in the DCI. Each aperiodic SRS resource set may be configured with a slot offset from 0 to 32. The slot offset is an offset in the number of slots between the triggering DCI and the actual transmission of the aperiodic SRS resource set. If the field is absent (e.g., blank or set to a value of zero), the UE applies no offset between the triggering DCI and the transmission of the aperiodic SRS resource set. Each SRS resource of an aperiodic SRS resource set may have an associated symbol index of the first symbol containing the SRS resource (e.g., the start position). An aperiodic SRS resource set may span multiple consecutive OFDM symbols, e.g., one, two, four, etc., symbols.

Some wireless communication systems have considered SRS postponing. For example, if at least one of the symbols of an SRS resource set in the configured slot offset are not available for SRS transmission, the SRS resource set is postponed to a later slot. This may be based on the slot type configuration, e.g., downlink, uplink or flexible. For example, if the symbol is configured as a downlink symbol, or a flexible symbol where a downlink physical channel has been triggered for transmission, then the symbol may not be available for SRS transmission, and the SRS resource set can be postponed for A slots, where A is the slot offset. A maximum number of slots for which an aperiodic SRS resource set can be postponed is also considered (e.g., a maximum number for $\Delta$), after which the SRS resource set is considered to have been dropped. Examples of the maximum number of slots include, but are not limited to, $\Delta$ is specified as a fixed value for all numerologies (e.g., 5 slots), a different specified value for each numerology (e.g., 5 slots for a 15 kHz sub-carrier spacing (SCS), but 10 slots for 30 kHz SCS), a specified absolute duration (e.g., 3 ms), configurable for each SRS resource set (e.g., at the RRC level), can be different for different use cases of the SRS resource set (e.g., for a set of antenna switching the $\Delta$ can be 5, but for a set of uplink codebook or non-codebook or uplink beam management the $\Delta$ can be equal to 0), etc. The maximum number postponed slots can be equal to the maximum slot offset that has been configured for a SRS resource set and/or the maximum postponed slots can be equal to the maximum slot offset that could be configured to any SRS resource set (e.g., up to 32 slots).

While such approaches may be suitable in some circumstances, these approaches limit the ability of base station 205 and/or UE 210 to more dynamically determine whether an SRS resource set is postponed or a conflicting OFDM symbol within an SRS resource set (e.g., a symbol that is otherwise unavailable for SRS transmission) can be omitted while maintaining SRS transmissions within the other symbols (e.g., the non-conflicting symbols). These approaches may result in SRS transmissions within a resource set being postponed unnecessarily, which may waste resources, disrupt communications between base station 205 and UE 210 (e.g., create a misunderstanding between base station 205 and UE 210 as to whether a particular SRS transmission will occur), and the like.

Accordingly, aspects of the described techniques provide mechanisms for determining whether to postpone (e.g., delay) an SRS resource set (e.g., a collection of reference signal transmissions, which may also be referred to as an SRS burst) or to omit one or more of the reference signal transmissions in the corresponding resource overlap (e.g., to drop reference signal transmission(s) in the symbol(s) that are unavailable for reference signal transmissions). That is, aspects of the described techniques provide various mechanisms to determine whether one or more conflicting reference signal transmissions (e.g., SRS transmissions) are to be omitted or the SRS resource set is postponed. For example, base station 205 may configure UE 210 with a collection of reference signal transmissions (e.g., an aperiodic SRS resource set or SRS burst that is configured via RRC signaling). Base station 205 and/or UE 210 may determine that there is a resource overlap with respect to one or more of the reference signal transmissions in the collection of reference signal transmissions. For example, base station 205 and/or UE 210 may determine that one or more symbols in the collection of reference signal transmissions are configured for a downlink transmission, or a flexible transmission, are allocated to another uplink channel having a higher priority than the reference signal transmission(s), are allocated as guard symbols, are allocated for a measurement gap/RF retuning gap, and/or are otherwise configured as unavailable for reference signal transmissions through implicit and/or explicit signaling from base station 205.

UE 210 and/or base station 205 may then identify one or more transmission properties for the collection of reference signal transmissions. Base station 205 and/or UE 210 (e.g., in order to ensure consistency between the devices) may consider the resource overlap and transmission properties when determining whether to omit one or more of the reference signal transmissions occurring in the corresponding resource overlap or to delay transmission of the collection of reference signal transmissions (e.g., to a later slot). The transmission properties and/or nature of the resource overlap may be considered individually, collectively, or in any combination, when determining whether to omit the conflicting reference signal transmissions or to delay transmitting the collection of reference signal transmissions. Accordingly, UE 210 may transmit (and base station 205 may receive) at least a portion of the collection of reference signal transmissions based on the omission/delay determination. For example, UE 205 may transmit the non-omitted reference signal transmission(s) during the configured slot 215 or may delay transmitting all of the collection of reference signal transmissions until a later slot (e.g., $\Delta$).

That is, the determination of whether to postpone or drop an aperiodic SRS (e.g., one or more reference signal transmissions from the collection of reference signal transmissions) when one or more symbols collide with the symbol(s) that is/are not available for SRS transmission may depend on the transmission properties of the aperiodic SRS resource set, e.g., the transmission properties of the collection of reference signals transmissions, as well as the nature of the resource overlap. Any of the transmission properties and/or their corresponding threshold levels/weighting factors may be explicitly and/or implicitly configured for UE 210 by base station 205. Moreover, any of the transmission properties may be allocated a higher or lower priority than others when making the determination. Moreover, UE 210 may transmit a UE capability message to base station 205 that carries or conveys an indication that UE 210 supports postponing or dropping reference signal transmissions based on the transmission properties, resource overlap, etc. Accordingly, base station 205 may configure UE 210 with the transmission properties, corresponding thresholds, and/or priority levels/weighting factors for the transmission properties by a configuration signal (e.g., an RRC signal).

In one example of the transmission properties, base station 205 and/or UE 210 may identify the length for the collection of reference signal transmissions as one of the transmission properties. This may include identifying a number of symbols configured for reference signal transmissions (e.g., the number of symbols within slot 215 that are actually configured for reference signal transmissions). This may include determining that the number of symbols configured for reference signal transmissions is less than the threshold. Base station 205 and/or UE 210 may determine to delay transmission of the collection of reference signal transmissions based on the number of symbols being less than the threshold. Base station 205 may configure UE with the threshold for the number of symbols configured for reference signal transmission.

That is, if the SRS resource set has a length spanning a large number of symbols, but only one or two of the symbols collide (e.g., are unavailable for reference signal transmission), then base station 205 and/or UE 210 may determine to omit those symbols and transmit the remaining reference signal transmissions during the other symbols (e.g., the non-colliding symbols that are available for reference signal transmission). This may be based on the fact that, since the majority of the SRS resource set can still be transmitted, it may be more beneficial to utilize those configured resources for reference signal transmissions. If however, the SRS resource set is a small number of symbols (e.g., one or two symbols), then base station 205 and/or UE 210 may postpone the whole transmission of the SRS resource set (e.g., may postpone transmitting the collection of reference signal transmissions). Accordingly, the threshold may indicate that, for a length <X, if at least one symbol collides than the whole SRS resource is postponed. Otherwise, the colliding symbols may be omitted and the remaining symbols may be transmitted.

In another example of the transmissions properties, base station 205 and/or UE 210 may identify a ratio of the first length of the resource overlap over a second length of the collection of reference signal transmissions as one of the transmission properties. For example, base station 205 and/or UE 210 may identify a number of symbols configured for reference signal transmissions (e.g., the second length) and a number of unavailable symbols (e.g., the first length) within the symbols configured for reference signal transmissions. If the number of symbols configured for reference signals transmission is less than the first threshold, base station 205 and/or UE 210 may determine to delay transmission of the collection of reference signal transmissions. However, if the number of symbols configured for reference signal transmission satisfies the first threshold, and the number of unavailable symbols is less than a second threshold, then base station 205 and/or UE 210 may omit reference signal transmissions in the corresponding resource overlap. That is, the decision may depend on a threshold according to the following equation (number of colliding or unavailable symbols/length or number of symbols of the SRS resource set)<X. In one non-limiting example, if the collection of reference signal transmissions spans one or two symbols and at least one of those symbols is unavailable, then it would be more beneficial to delay the reference signal transmissions. In another non-limiting example, if the collection of reference signal transmissions spans four symbols, but only one of those symbols is unavailable, then it would be more beneficial to omit the unavailable symbol and transmit reference signal transmissions in the remaining symbols.

In another example of the transmission properties, base station 205 and/or UE 210 may identify a use for the collection of reference signal transmissions. For example, if the reference signal transmissions are positioning reference signal transmissions, then base station 205 and/or UE 210 may delay transmission of the collection reference signal transmissions. That is, the use/purpose of the SRS resource set (e.g., the collection of reference signal transmissions) may be considered when determining whether to delay or omit transmissions. For an SRS transmission used for positioning, omitting one or more symbols may result in partially transmitting an SRS resource that is partially staggered. This may create alias/spurious picks in the time of arrival (TOA) estimation. Accordingly, for an SRS used for positioning, it may be more beneficial to always delay or postpone the reference signal transmissions, even if only one symbol is a colliding symbol or otherwise unavailable for reference signal transmission. Other rules for determining whether to omit or delay may also be applicable depending on different use cases for the reference signal transmissions. Moreover, the threshold for the length and/or ratio of the colliding symbols (e.g., as discussed above) may also be usage/purpose-specific.

In another example of the transmission properties, base station 205 and/or UE 210 may identify a location of the resource overlap within the collection of reference signal transmissions. For example, if the resource overlap occurs between the first set of symbols and a second set of symbols (e.g., somewhere in the middle of the SRS resource set) configured for the reference signal transmissions, then base station 205 and/or UE 210 may determine to delay transmission of the collection of reference signals. However, if the resource overlap occurs either during a beginning symbol or an ending symbol configured for reference signal transmissions, then base station 205 and/or UE 210 may omit reference signal transmissions in the corresponding resource overlap. That is, base station 205 and UE 210 may determine the location of the colliding SRS symbols (e.g., the unavailable symbols) with respect to the SRS burst (e.g., the collection of reference signal transmissions in symbols that are available for reference signal transmission). If the symbol that is colliding is in the middle of the burst, then the phase continuity cannot be guaranteed between the first and second part of the remaining SRS burst. Accordingly, it may be more beneficial to postpone or delay the SRS resource set altogether. On the other hand, if the colliding symbols are at the beginning or end of an SRS burst, then the remaining non-colliding SRS burst would still be phase continuous and omitting the colliding symbols may be more beneficial.

In another example of the transmission properties, base station 205 and/or UE 210 may identify a staggering configuration for the collection of reference signal transmissions. Base station 205 and/or UE 210 may delay transmission of the collection of reference signal transmissions if the reference signal transmissions are configured for staggering transmissions or omit the reference signal transmissions in the corresponding resource overlap if the collection of reference signal transmissions are configured for non-staggering transmissions. That is, if the SRS resource set is configured with staggering, omitting one or more symbols may result in partially transmitting an SRS resource that is partially staggered. This may create alias/spurious picks in the TOA estimation. Therefore, it may be more beneficial to always postpone, even if only one symbol is colliding, transmitting the collection of reference signal transmissions. The rules may be applicable for any other SRS resource set configured without staggering. In some aspects, the threshold of the length or ratio of the colliding symbols, as discussed above, may be dependent upon whether staggering is configured.

In another example of the transmission properties, base station 205 and/or UE 210 may identify a repetition configuration for the collection of reference signal transmissions. Base station 205 and/or UE 210 may omit the reference signal transmissions in the corresponding resource overlap if the reference signal transmissions are configured for repetition transmissions across a plurality of slots. That is, if an SRS resource that is configured with repetition across multiple slots, then postponing may result in postponing the second, third, etc., part (e.g., repetitions) in the subsequent slots. This may create higher complexity for the UE's bookkeeping of the SRS transmission. Accordingly, if the SRS transmission is configured across multiple slots, then base station 205 and/or UE 210 may omit the colliding symbols, but transmit the reference signal transmissions in the remaining symbols.

As discussed above, base station 205 and/or UE 210 may utilize the resource overlap (e.g., the number and/or location of colliding symbols) and any of the transmission properties, alone or in any combination, when determining whether to delay or omit reference signal transmissions. Base station 205 may transmit a configuration signal to UE 210 identifying which transmission properties are to be utilized and their associated threshold levels and/or weighting factors. Base station 205 may configure UE 210 with the transmission properties based on the capability of UE 210, e.g., as indicated in a UE capability message. UE 210 may utilize the transmission properties and nature of the resource overlap in making the delay/omission determination and base station 205 may utilize the same transmission properties and nature of the resource overlap in determining whether UE 210 will delay or omit the associated reference signal transmissions.

Figure 3:
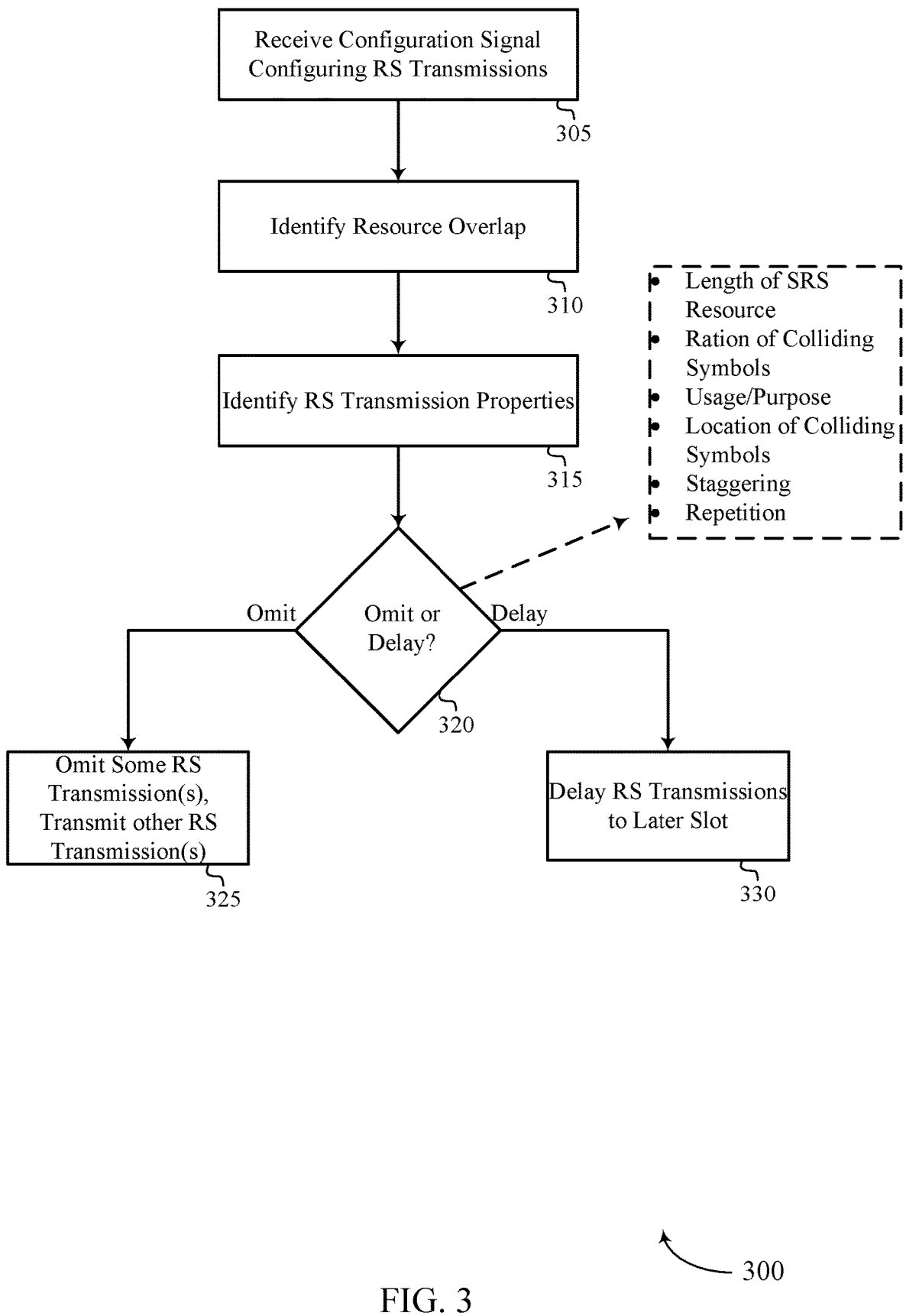
FIG. 3 illustrates an example of a method that supports reference signal transmission omission and postponing in accordance with aspects of the present disclosure.

FIG. 3 illustrates an example of a method 300 that supports reference signal transmission omission and postponing in accordance with aspects of the present disclosure. In some examples, method 300 may implement aspects of wireless communication systems 100 and/or 200. Aspects of method 300 may be implemented by a UE and/or base station, which may be examples of the corresponding devices described herein.

At 305, the base station may configure the UE with the collection of reference signal transmissions (e.g., an SRS resource set over which SRS transmissions, or an SRS burst, can occur) for the UE to transmit in consecutive symbols within one or more slots. For example, the base station may transmit an RRC signal to the UE configuring the UE with the collection of reference signal transmissions. In some examples, the collection of reference signal transmissions may be configured with or without staggering and/or repetition. The collection of reference signal transmissions may include aperiodic SRS resources spanning one or more consecutive symbols within the slot(s).

At 310, the base station and/or UE may identify a resource overlap between the collection of reference signal transmissions and another resource that is unavailable for reference signal transmissions. Broadly, the resource overlap may correspond to one or more symbols that are unavailable for reference signal transmission, but are otherwise included in the configured collection of reference signal transmissions. For example, the resource overlap may correspond to a symbol that is configured as a downlink symbol, or a flexible symbol configured for a downlink transmission, or allocated to another uplink channel having a higher priority than the reference signal transmission(s), or allocated as guard symbols, or allocated for a measurement gap/RF retuning gap, and/or is otherwise configured as unavailable for reference signal transmissions through implicit and/or explicit signaling. In some aspects, the resource overlap may be identified after the base station as configured the UE with the collection of reference signal transmissions, e.g., between the triggering DCI and the beginning slot indicated in the slot offset.

At 315, the base station and/or UE may identify one or more transmission properties for the collection of reference signal transmissions. Examples of the transmission properties include, but are not limited to, any combination of the length of the SRS resource, the ratio of the number of colliding symbols over the length of the SRS resource, the usage/purpose of the SRS resource, the location of the colliding SRS symbols with respect to the SRS burst, whether or not the SRS resources are configured with staggering and/or repetition, and the like.

Accordingly and at 320, the UE may determine whether to omit one or more of the reference signal transmissions from the collection of reference signal transmissions in the corresponding resource overlap or to delay transmission of the collection of reference signal transmissions. As the base station is aware of the transmission properties configured for the UE, it may follow these techniques to determine whether the UE will omit one or more of the reference signal transmissions in the corresponding resource overlap or to delay transmission of the collection of reference signal transmissions. For example, the base station may transmit a configuration signal to the UE configuring or otherwise identifying which transmission properties are to be considered, as well as any associated threshold/weighting factor to be applied to the corresponding transmission property. The base station may configure the UE with the relevant transmission properties and their associated thresholds/weighting factor once (e.g., for any configured collection of reference signal transmissions), periodically (e.g., for configured collections of reference signal transmissions occurring within the period), as-needed (e.g., may reconfigure the UE with different transmission properties based on various triggering conditions), and/or on a per-SRS burst configuration (e.g., may signal which transmission properties are relevant for any configured and/or activated collection of reference signal transmissions).

Accordingly and at 325, the UE may determine to omit some reference signal transmissions, but transmit the other reference signal transmissions within the collection of reference signal transmissions. That is, the UE may determine to omit reference signal transmissions from the collection of reference signal transmissions in the corresponding resource overlap (e.g., to omit SRS transmissions in the colliding symbols). The UE may transmit the other reference signal transmissions from the collection of reference signal transmissions in symbols other than the resource overlap (e.g., to transmit SRS transmissions in the non-colliding symbols).

Conversely and at 330, the UE may determine to delay transmission of the collection reference signal transmissions to a subsequent slot. For example, the UE may determine that the collection of reference signal transmissions configured by the base station for slot N may be delayed $\Delta$ slots.

As the base station has configured the UE with the relevant transmission properties and their corresponding threshold(s)/weighting factor(s), it may therefore know which reference signals are being omitted, delayed, or transmitted by the UE.

Figure 4:
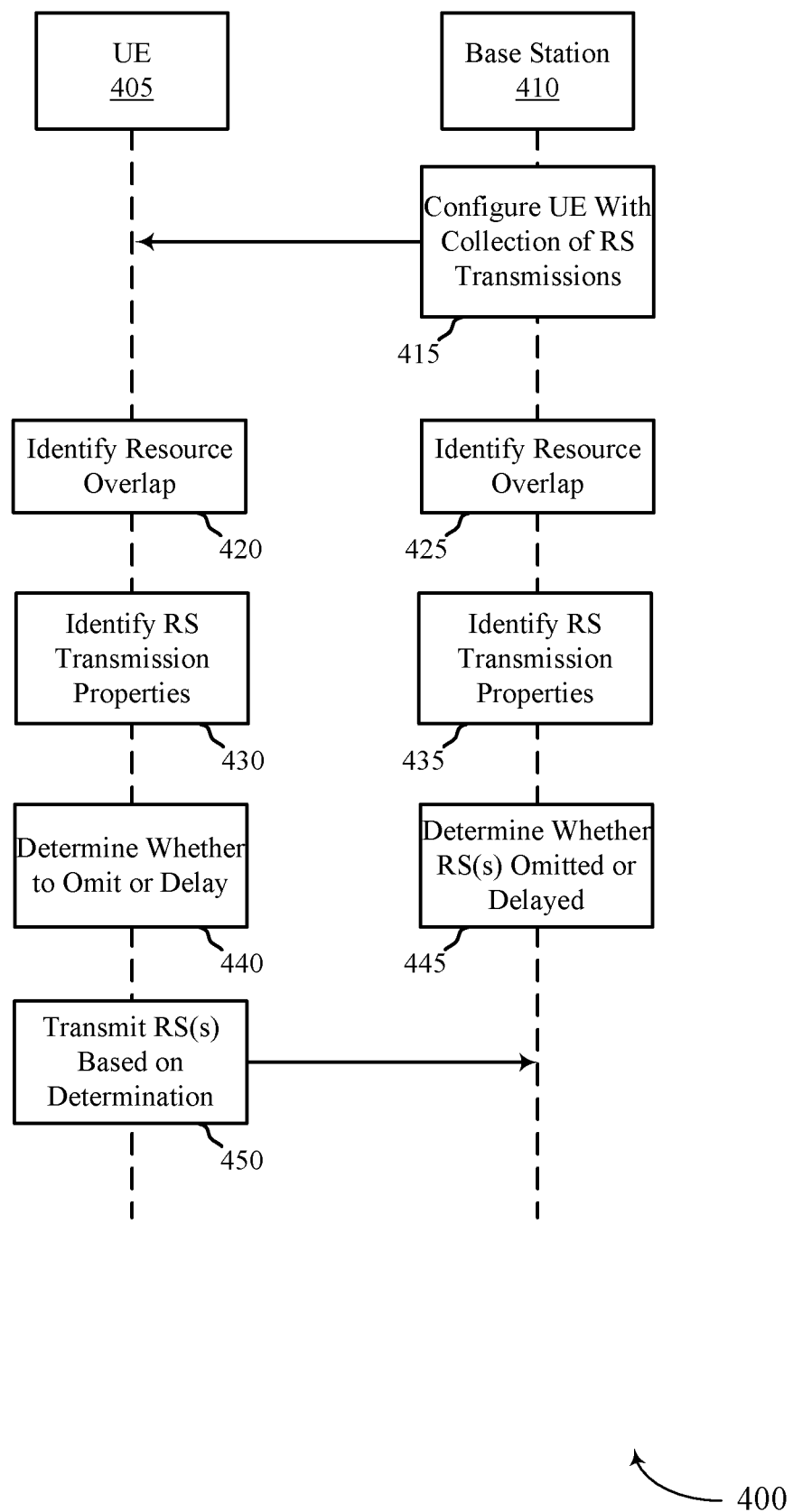
FIG. 4 illustrates an example of a process that supports reference signal transmission omission and postponing in accordance with aspects of the present disclosure.

FIG. 4 illustrates an example of a process 400 that supports reference signal transmission omission and postponing in accordance with aspects of the present disclosure. In some examples, process 400 may implement aspects of wireless communication systems 100 and/or 200 and/or method 300. Aspects of process 400 may be implemented by UE 405 and/or base station 410, which may be examples of corresponding devices described herein.

At 415, base station 410 may transmit (and UE 405 may receive) a configuration signal (e.g., an RRC signal) configuring UE 405 with a collection of reference signal transmissions. The collection of reference signal transmissions may correspond to an SRS resource set having a repetition factor of R, wherein R denotes the number of reference signal transmissions within consecutive symbols of a slot.

That is, the collection of reference signal transmissions may correspond to an SRS resource set configured for an SRS burst within the slot.

At 420, UE 405 may identify a resource overlap between the collection of reference signal transmissions and another resource that is unavailable for reference signal transmissions. That is, UE 405 may determine or otherwise identify one or more symbols that are unavailable for reference signal transmission, but are otherwise configured within the collection of reference signal transmissions. This may indicate that the symbols or resources therefore cannot be used for reference signal transmissions by UE 405.

Similarly and at 425, base station 410 may identify a resource overlap between the collection of reference signal transmissions and another resource that is unavailable for reference signal transmissions. That is, base station 410 may determine or otherwise identify one or more symbols that are unavailable for reference signal transmission, but are otherwise configured within the collection of reference signal transmissions. This may indicate that the symbols or resources therefore cannot be used for reference signal transmissions by UE 405. For example, base station 410 may have configured UE 405 with the collection of reference signal transmissions a number of slots beforehand (e.g., with a high slot offset number, such as 8, 16, or even 32 slots). Subsequently, one or more of the symbols in the collection of reference signal transmissions may become unavailable for reference signal transmission due to any number of factors, such as slot format changes, higher priority communications being scheduled for the corresponding symbols, and the like.

At 430, UE 405 may identify one or more transmission properties for the collection of reference signal transmissions. UE 405 may autonomously identify and select transmission properties to be applied for the collection reference signal transmissions and/or may be configured with which transmission properties are to be applied for the collection of reference signal transmissions. For example, base station 410 may transmit a signal to UE 405 identifying or otherwise configuring the transmission properties to be considered, as well as any associated thresholds, weighting factors, and the like.

Similarly and at 435, base station 410 may identify the one or more transmission properties for the collection of reference signal transmissions. In the example where base station 410 configured UE 405 with the relevant transmission properties, base station 410 may identify the transmission properties to be applied to the collection of reference signal transmissions based on that configuration. In the situation where UE 405 autonomously identifies the transmission properties for the collection of reference signal transmissions, base station 410 may otherwise be aware of the same factors being considered by UE 405 in order to reach or otherwise identify the same transmission properties, e.g., using common configuration information known by each device.

At 440, UE 405 will determine, based on the transmission properties and the resource overlap, whether to omit one or more of the reference signal transmissions from the collection of reference signal transmissions in the corresponding resource overlap or to delay transmission of the collection of reference signal transmissions. Similarly and at 445, base station 410 will determine, based on the transmission properties and the resource overlap, whether UE 405 will omit one or more of the reference signal transmissions from the collection of reference signal transmissions in the corresponding resource overlap or delay transmission of the collection of reference signal transmissions.

For example, UE 405 and/or base station 410 may identify the nature of the resource overlap (e.g., the number and/or location of colliding symbols which are unavailable for reference signal transmission). UE 405 and/or base station 410 may identify transmission properties such as, but not limited to, a length of the collection of reference signal transmissions, a ratio of the resource overlap for the collection of reference signal transmissions, a use/purpose for the collection of reference signal transmission, a location of the resource overlap within the collection of reference signal transmissions, whether or not the collection of reference signal transmissions are configured for staggering and/or repetition, and the like. Based on the nature of the resource overlap and the transmission properties being considered (and associated threshold levels, weighting factors, etc.), UE 405 may make the omission/delay determination for the collection of reference signal transmissions. As base station 410 is aware of the nature of the resource overlap and the transmission properties (and associated threshold levels, weighting factors, etc.) being considered by UE 405, it may make reach the same determination as UE 405, and therefore no which reference signals are being transmitted and which reference signals are being delayed.

At 450, UE 405 may transmit (and base station 410 may receive) at least a portion of the collection of reference signal transmissions based on the omission/delay determination. For example, UE 405 may transmit some of the reference signal transmissions from the collection of reference signal transmissions if it determines to omit reference signal transmissions in the corresponding resource overlap. Otherwise, UE 405 may transmit all of the reference signal transmissions from the collection of reference signals transmissions in a later slot if it determines to delay transmission of the collection of reference signal transmissions.

Figure 5:
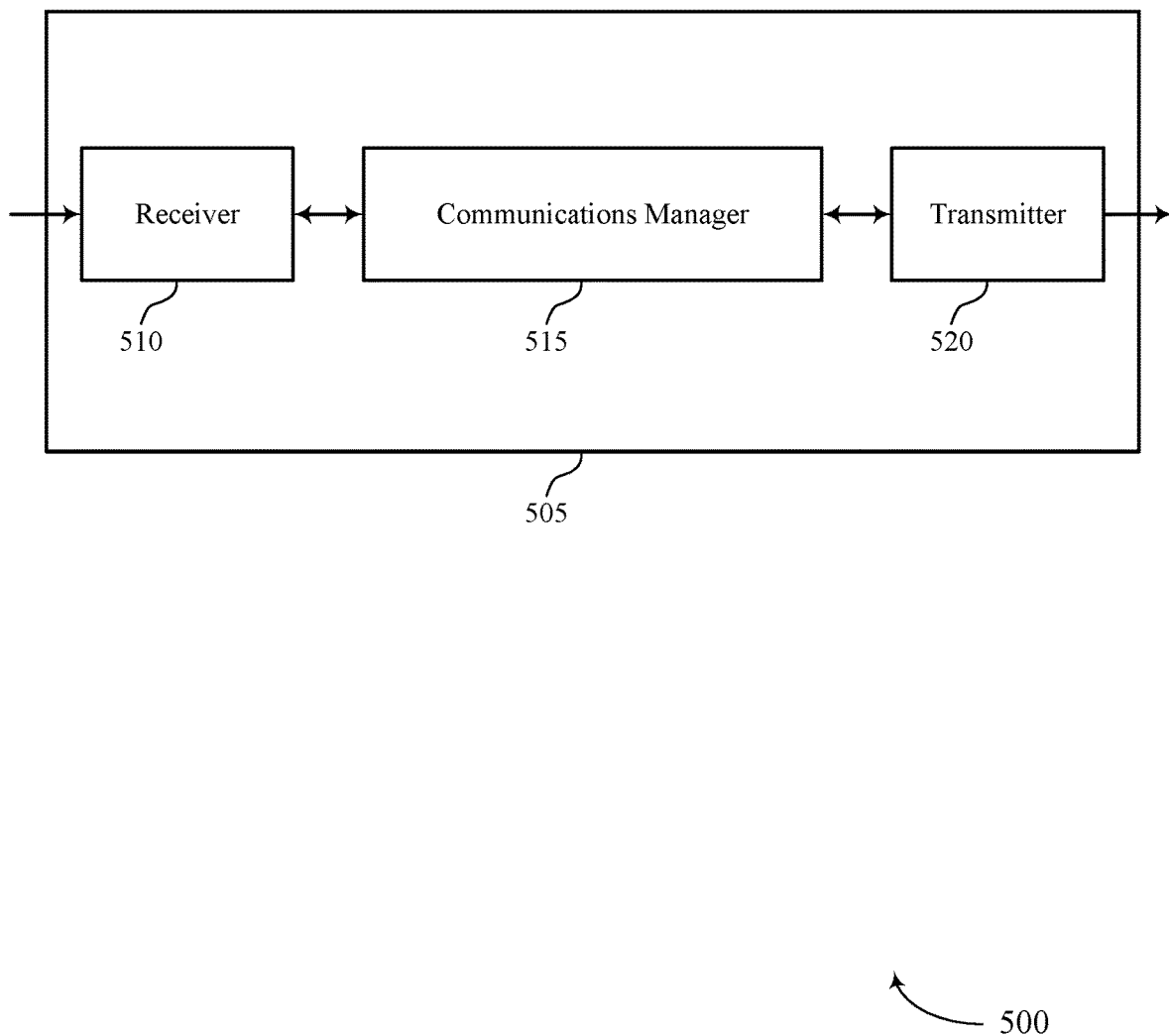
FIGS. 5 and 6 show block diagrams of devices that support reference signal transmission omission and postponing in accordance with aspects of the present disclosure.

FIG. 5 shows a block diagram 500 of a device 505 that supports reference signal transmission omission and postponing in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reference signal transmission omission and postponing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether to omit one or more of the reference signal transmissions of the collection of reference signal transmissions in the corresponding resource overlap or to delay transmission of the collection of reference signal transmissions, and transmit at least a portion of the collection of reference signal transmissions based on the determining. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
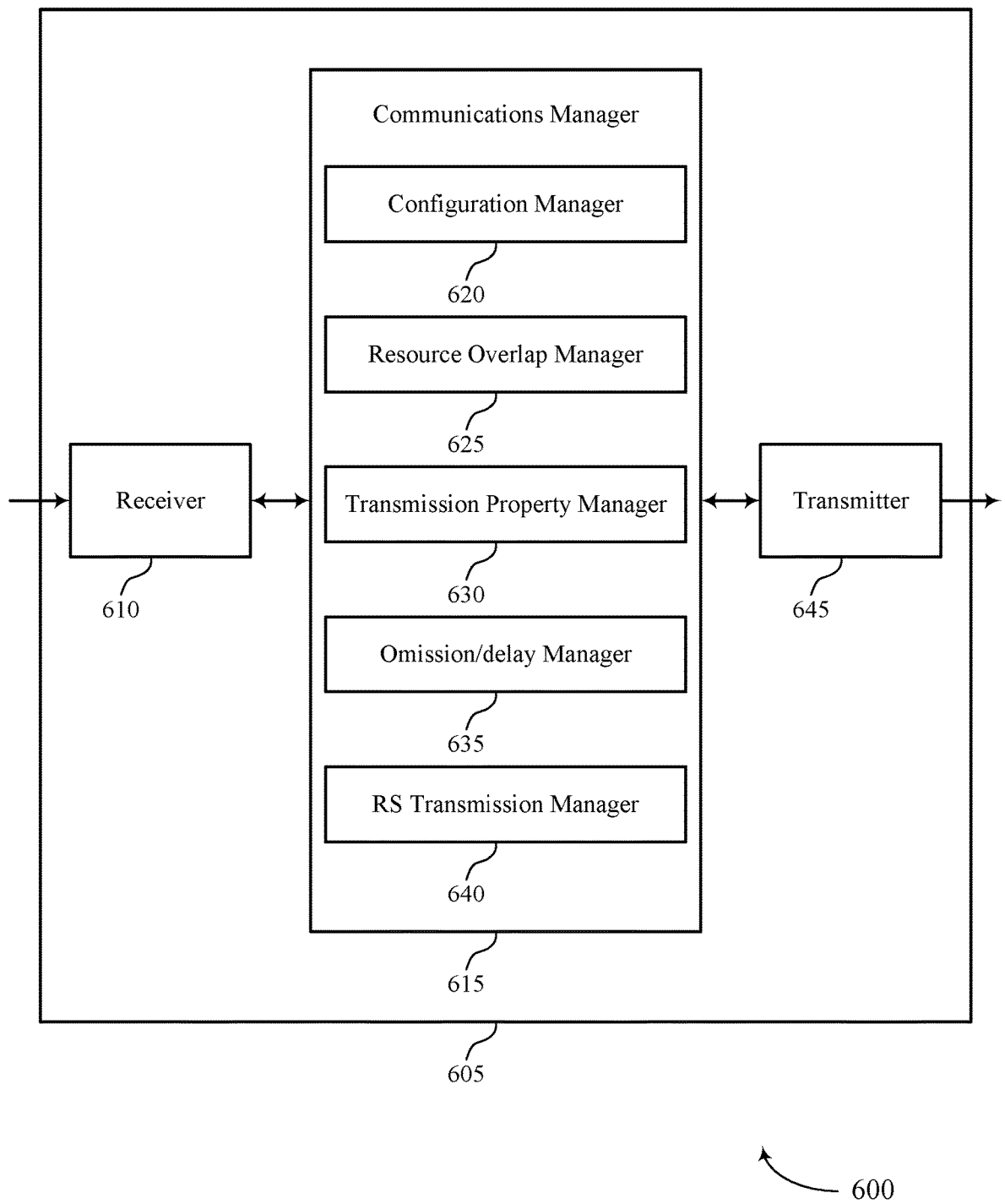

FIG. 6 shows a block diagram 600 of a device 605 that supports reference signal transmission omission and postponing in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to reference signal transmission omission and postponing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a resource overlap manager 625, a transmission property manager 630, an omission/delay manager 635, and a RS transmission manager 640. The communications manager 615 may be an example of aspects of the communications manager 810 described herein.

The configuration manager 620 may receive a configuration signal configuring a collection of reference signal transmissions.

The resource overlap manager 625 may identify a resource overlap between the collection of reference signal transmissions and another resource that is unavailable for reference signal transmissions.

The transmission property manager 630 may identify one or more transmission properties for the collection of reference signal transmissions.

The omission/delay manager 635 may determine, based on the one or more transmission properties and the resource overlap, whether to omit one or more of the reference signal transmissions of the collection of reference signal transmissions in the corresponding resource overlap or to delay transmission of the collection of reference signal transmissions.

The RS transmission manager 640 may transmit at least a portion of the collection of reference signal transmissions based on the determining.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
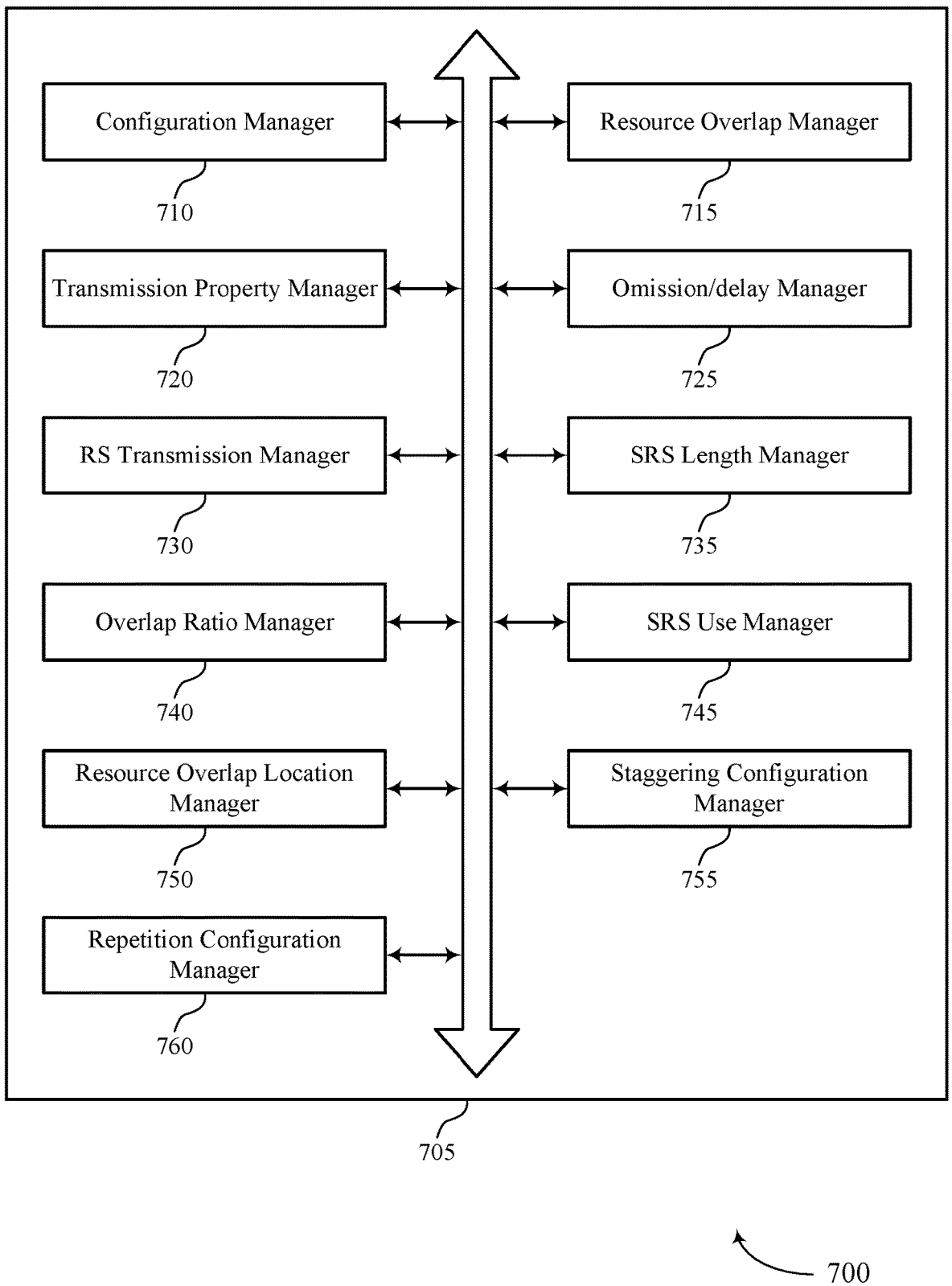
FIG. 7 shows a block diagram of a communications manager that supports reference signal transmission omission and postponing in accordance with aspects of the present disclosure.

FIG. 7 shows a block diagram 700 of a communications manager 705 that supports reference signal transmission omission and postponing in accordance with aspects of the present disclosure. The communications manager 705 may be an example of aspects of a communications manager 515, a communications manager 615, or a communications manager 810 described herein. The communications manager 705 may include a configuration manager 710, a resource overlap manager 715, a transmission property manager 720, an omission/delay manager 725, a RS transmission manager 730, a SRS length manager 735, an overlap ratio manager 740, a SRS use manager 745, a resource overlap location manager 750, a staggering configuration manager 755, and a repetition configuration manager 760. Each of these modules may communicate, directly or indirectly, with one another (e.g., via one or more buses).

The configuration manager 710 may receive a configuration signal configuring a collection of reference signal transmissions. In some cases, the collection of reference signal transmissions include a SRS resource having a repetition factor of R, where R includes a number of reference signal transmissions within consecutive symbols.

The resource overlap manager 715 may identify a resource overlap between the collection of reference signal transmissions and another resource that is unavailable for reference signal transmissions.

The transmission property manager 720 may identify one or more transmission properties for the collection of reference signal transmissions.

In some examples, the transmission property manager 720 may identify at least one of a length of the collection of reference signal transmissions, or a ratio of resource overlap for the collection of reference signal transmissions, or a use for the collection of reference signal transmissions, or a location of the resource overlap within the collection of reference signal transmissions, or a staggering configuration for the collection of reference signal transmissions, or a repetition configuration for the collection of reference signal transmissions, or any combination thereof.

In some examples, the transmission property manager 720 may receive an indication of at least one of the one or more transmission properties, one or more thresholds associated with the one or more transmission properties, or a combination thereof.

The omission/delay manager 725 may determine, based on the one or more transmission properties and the resource overlap, whether to omit one or more of the reference signal transmissions of the collection of reference signal transmissions in the corresponding resource overlap or to delay transmission of the collection of reference signal transmissions.

The RS transmission manager 730 may transmit at least a portion of the collection of reference signal transmissions based on the determining.

The SRS length manager 735 may identify a length of the collection of reference signal transmissions, where the one or more transmission properties include the length of the collection of reference signal transmissions. In some examples, the SRS length manager 735 may identify, based on the configuration signal, a number of symbols configured for reference signal transmissions. In some examples, the SRS length manager 735 may determine that the number of symbols configured for reference signal transmissions is less than a threshold. In some examples, the SRS length manager 735 may determine to delay transmission of the collection of reference signal transmissions based on the number of symbols being less than the threshold. In some examples, the SRS length manager 735 may receive an indication of the threshold for the number of symbols.

The overlap ratio manager 740 may identify a ratio of a first length of the resource overlap over a second length of the collection of reference signal transmissions, where the one or more transmission properties include the ratio of resource overlap. In some examples, the overlap ratio manager 740 may identify, based on the configuration signal, a number of symbols configured for reference signal transmissions, where the number of symbols include the second length. In some examples, the overlap ratio manager 740 may identify, based on the resource overlap, a number of unavailable symbols within the symbols configured for reference signal transmissions, where the number of unavailable symbols include the first length.

In some examples, the overlap ratio manager 740 may determine that the number of symbols configured for reference signal transmissions is less than a first threshold. In some examples, the overlap ratio manager 740 may determine to delay transmission of the collection of reference signal transmissions based on the number of symbols being less than the first threshold and the number of unavailable symbols. In some examples, the overlap ratio manager 740 may receive an indication of the first threshold for the number of symbols. In some examples, the overlap ratio manager 740 may determine that the number of symbols configured for reference signal transmissions satisfies a first threshold. In some examples, the overlap ratio manager 740 may determine that the number of unavailable symbols is less than a second threshold.

In some examples, the overlap ratio manager 740 may determine to omit the reference signal transmissions in the corresponding resource overlap based on the number of symbols satisfying the first threshold and the number of unavailable symbols being less than the second threshold. In some examples, the overlap ratio manager 740 may receive an indication of the first threshold for the number of symbols and the second threshold for the unavailable symbols.

The SRS use manager 745 may identify a use for the collection of reference signal transmissions, where the one or more transmission properties include the use for the collection of reference signal transmissions. In some examples, the SRS use manager 745 may determine that the reference signal transmissions include positioning reference signal transmissions. In some examples, the SRS use manager 745 may determine to delay transmission of the collection of reference signal transmissions based on the reference signal transmissions including positioning reference signal transmissions.

The resource overlap location manager 750 may identify a location of the resource overlap within the collection of reference signal transmissions, where the one or more transmission properties include the location of the resource overlap within the collection of reference signal transmissions. In some examples, the resource overlap location manager 750 may determine that the resource overlap occurs between a first set of symbols and a second set of symbols configured for reference signal transmissions. In some examples, the resource overlap location manager 750 may determine to delay transmission of the collection of reference signal transmissions based on the resource overlap occurring between the first set of symbols and the second set of symbols.

In some examples, the resource overlap location manager 750 may determine that the resource overlap occurs either during a beginning symbol or an ending symbol configured for reference signal transmissions. In some examples, the resource overlap location manager 750 may determine to omit the reference signal transmissions in the corresponding resource overlap based on the resource overlap occurring either during the beginning symbol or the ending symbol.

The staggering configuration manager 755 may identify a staggering configuration for the collection of reference signal transmissions, where the one or more transmission properties include the staggering configuration for the collection of reference signal transmissions. In some examples, the staggering configuration manager 755 may determine that the collection of reference signal transmissions are configured for staggering transmissions. In some examples, the staggering configuration manager 755 may determine to delay transmission of the collection of reference signal transmissions based on the staggering transmissions. In some examples, the staggering configuration manager 755 may determine that the collection of reference signal transmissions are configured for non-staggering transmissions. In some examples, the staggering configuration manager 755 may determine to omit the reference signal transmissions in the corresponding resource overlap based on the non-staggering transmissions.

The repetition configuration manager 760 may identify a repetition configuration for the collection of reference signal transmissions, where the one or more transmission properties include the repetition configuration for the collection of reference signal transmissions. In some examples, the repetition configuration manager 760 may determine that the collection of reference signal transmissions are configured for repetition transmissions across a set of slots. In some examples, the repetition configuration manager 760 may determine to omit the reference signal transmissions in the corresponding resource overlap based on the repetition transmissions.

In some examples, the repetition configuration manager 760 may determine that the collection of reference signal transmissions are configured for non-repetition transmissions. In some examples, the repetition configuration manager 760 may determine whether to omit the reference signal transmissions in the corresponding resource overlap or to delay transmission of the collection of reference signal transmissions based on the non-repetition transmissions.

Figure 8:
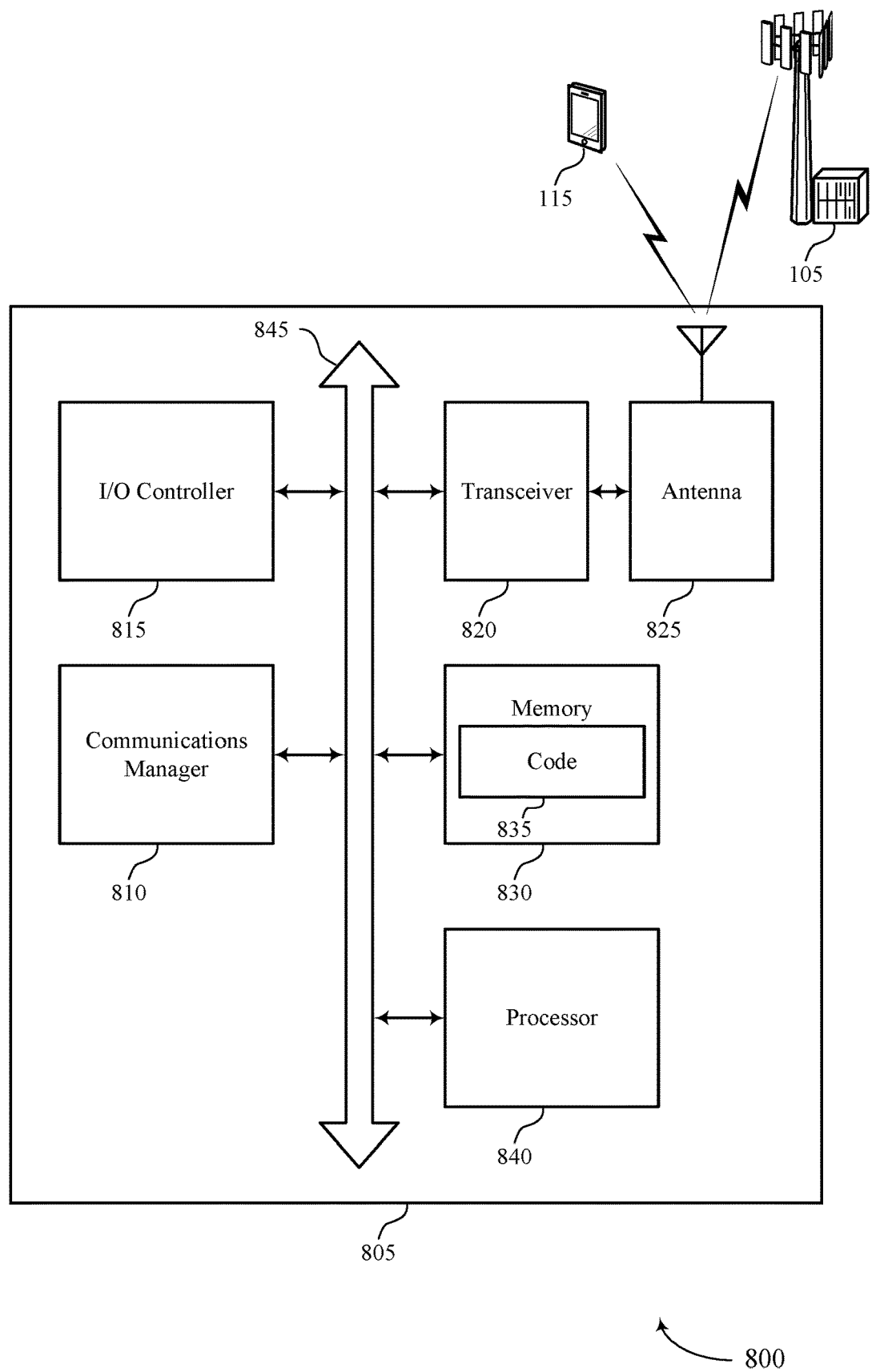
FIG. 8 shows a diagram of a system including a device that supports reference signal transmission omission and postponing in accordance with aspects of the present disclosure.

FIG. 8 shows a diagram of a system 800 including a device 805 that supports reference signal transmission omission and postponing in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether to omit one or more of the reference signal transmissions of the collection of reference signal transmissions in the corresponding resource overlap or to delay transmission of the collection of reference signal transmissions, and transmit at least a portion of the collection of reference signal transmissions based on the determining.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal transmission omission and postponing).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
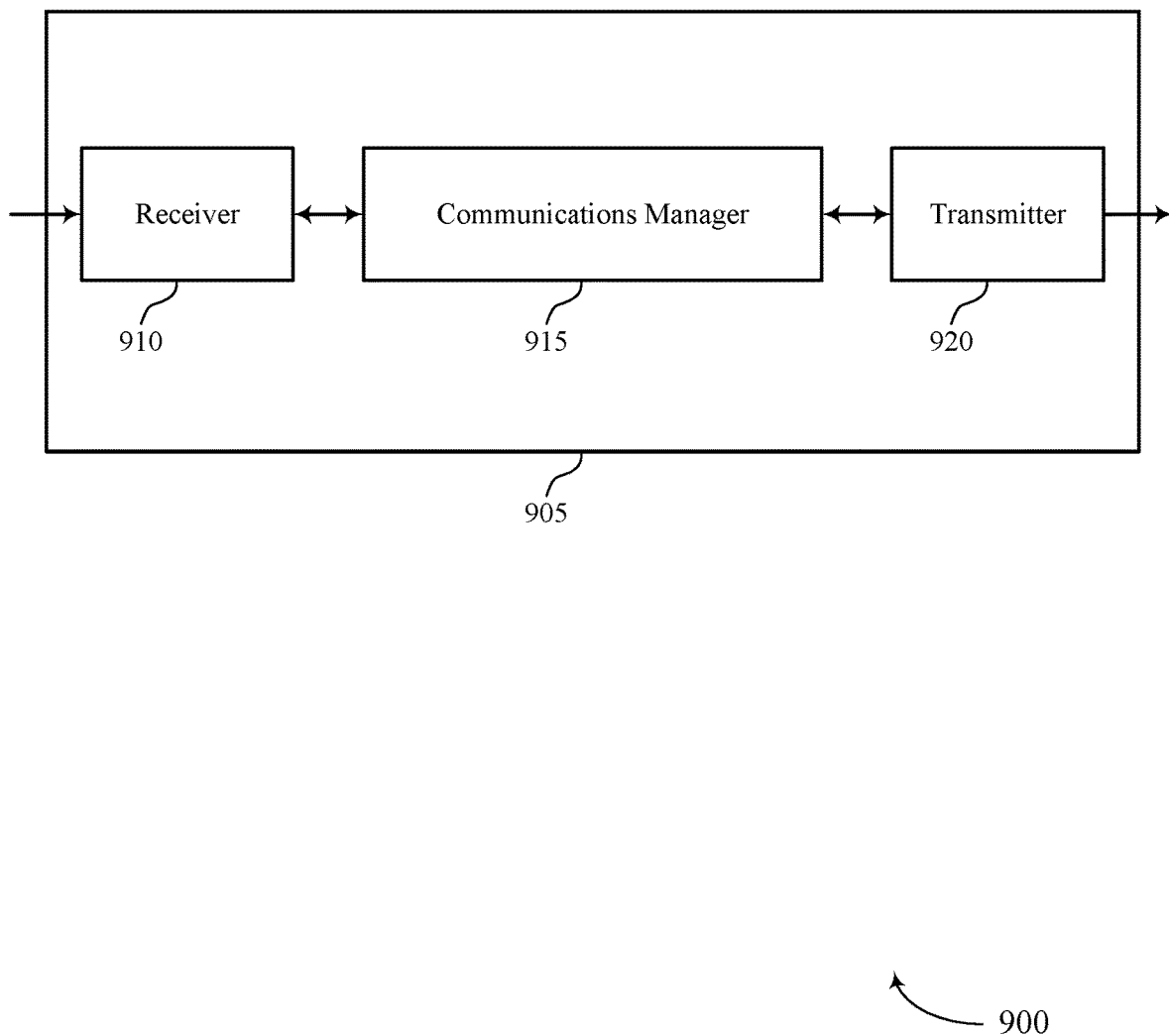
FIGS. 9 and 10 show block diagrams of devices that support reference signal transmission omission and postponing in accordance with aspects of the present disclosure.

FIG. 9 shows a block diagram 900 of a device 905 that supports reference signal transmission omission and postponing in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signal transmission omission and postponing, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether one or more of the reference signal transmissions of the collection of reference signal transmissions in the corresponding resource overlap are omitted or the transmission of the collection of reference signal transmissions is delayed, and receive at least a portion of the collection of reference signal transmissions based on the determining. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
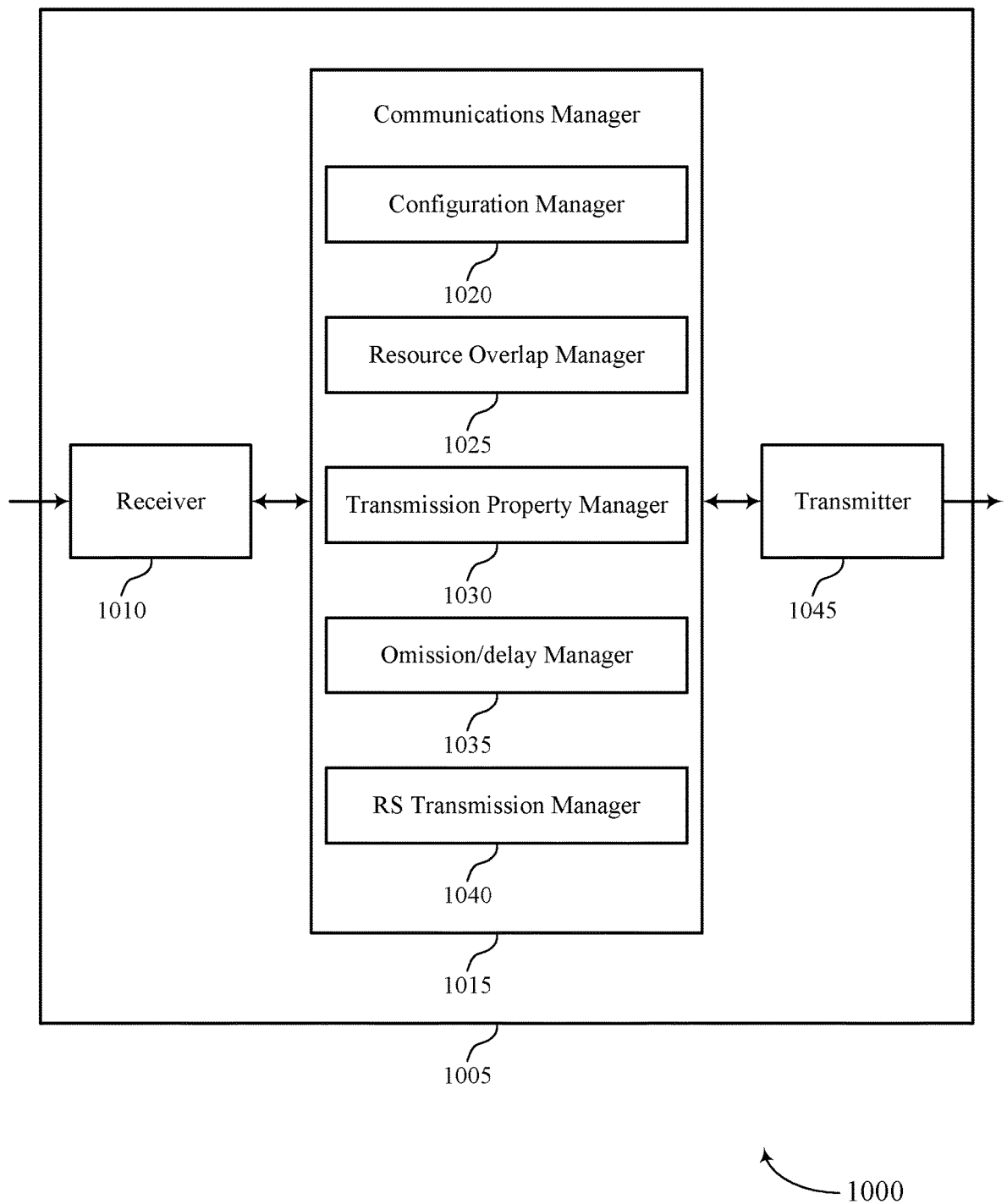

FIG. 10 shows a block diagram 1000 of a device 1005 that supports reference signal transmission omission and postponing in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal transmission omission and postponing, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration manager 1020, a resource overlap manager 1025, a transmission property manager 1030, an omission/delay manager 1035, and a RS transmission manager 1040. The communications manager 1015 may be an example of aspects of the communications manager 1210 described herein.

The configuration manager 1020 may transmit, to a UE, a configuration signal configuring a collection of reference signal transmissions.

The resource overlap manager 1025 may identify a resource overlap between the collection of reference signal transmissions and another resource that is unavailable for reference signal transmissions.

The transmission property manager 1030 may identify one or more transmission properties for the collection of reference signal transmissions.

The omission/delay manager 1035 may determine, based on the one or more transmission properties and the resource overlap, whether one or more of the reference signal transmissions of the collection of reference signal transmissions in the corresponding resource overlap are omitted or the transmission of the collection of reference signal transmissions is delayed.

The RS transmission manager 1040 may receive at least a portion of the collection of reference signal transmissions based on the determining.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
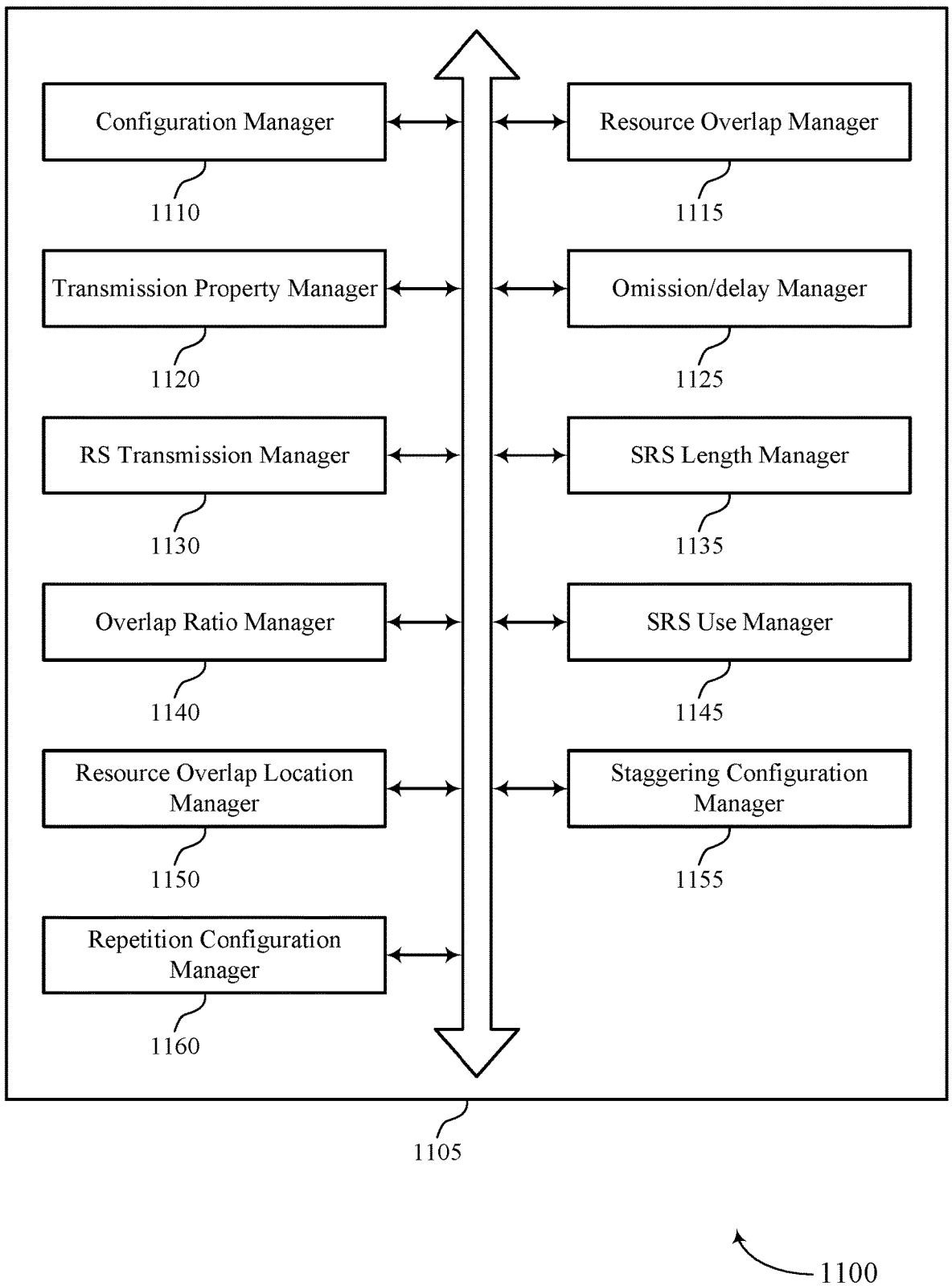
FIG. 11 shows a block diagram of a communications manager that supports reference signal transmission omission and postponing in accordance with aspects of the present disclosure.

FIG. 11 shows a block diagram 1100 of a communications manager 1105 that supports reference signal transmission omission and postponing in accordance with aspects of the present disclosure. The communications manager 1105 may be an example of aspects of a communications manager 915, a communications manager 1015, or a communications manager 1210 described herein. The communications manager 1105 may include a configuration manager 1110, a resource overlap manager 1115, a transmission property manager 1120, an omission/delay manager 1125, a RS transmission manager 1130, a SRS length manager 1135, an overlap ratio manager 1140, a SRS use manager 1145, a resource overlap location manager 1150, a staggering configuration manager 1155, and a repetition configuration manager 1160. Each of these modules may communicate, directly or indirectly, with one another (e.g., via one or more buses).

The configuration manager 1110 may transmit, to a UE, a configuration signal configuring a collection of reference signal transmissions. In some cases, the collection of reference signal transmissions include a SRS resource having a repetition factor of R, where R includes a number of reference signal transmissions within consecutive symbols.

The resource overlap manager 1115 may identify a resource overlap between the collection of reference signal transmissions and another resource that is unavailable for reference signal transmissions.

The transmission property manager 1120 may identify one or more transmission properties for the collection of reference signal transmissions. In some examples, the transmission property manager 1120 may identify at least one of a length of the collection of reference signal transmissions, or a ratio of resource overlap for the collection of reference signal transmissions, or a use for the collection of reference signal transmissions, or a location of the resource overlap within the collection of reference signal transmissions, or a staggering configuration for the collection of reference signal transmissions, or a repetition configuration for the collection of reference signal transmissions, or any combination thereof.

In some examples, the transmission property manager 1120 may transmit an indication of the one or more transmission properties, one or more thresholds associated with the one or more transmission properties, or a combination thereof.

The omission/delay manager 1125 may determine, based on the one or more transmission properties and the resource overlap, whether one or more of the reference signal transmissions of the collection of reference signal transmissions in the corresponding resource overlap are omitted or the transmission of the collection of reference signal transmissions is delayed.

The RS transmission manager 1130 may receive at least a portion of the collection of reference signal transmissions based on the determining.

The SRS length manager 1135 may identify a length of the collection of reference signal transmissions, where the one or more transmission properties include the length of the collection of reference signal transmissions. In some examples, the SRS length manager 1135 may identify, based on the configuration signal, a number of symbols configured for reference signal transmissions. In some examples, the SRS length manager 1135 may determine that the number of symbols configured for reference signal transmissions is less than a threshold. In some examples, the SRS length manager 1135 may determine that the transmission of the collection of reference signal transmissions is delayed based on the number of symbols being less than the threshold. In some examples, the SRS length manager 1135 may transmit an indication of the threshold for the number of symbols.

The overlap ratio manager 1140 may identify a ratio of a first length of the resource overlap over a second length of the collection of reference signal transmissions, where the one or more transmission properties include the ratio of resource overlap. In some examples, the overlap ratio manager 1140 may identify, based on the configuration signal, a number of symbols configured for reference signal transmissions, where the number of symbols include the second length. In some examples, the overlap ratio manager 1140 may identify, based on the resource overlap, a number of unavailable symbols within the symbols configured for reference signal transmissions, where the number of unavailable symbols include the first length. In some examples, the overlap ratio manager 1140 may determine that the number of symbols configured for reference signal transmissions is less than a first threshold.

In some examples, the overlap ratio manager 1140 may determine that transmission of the collection of reference signal transmissions is delayed based on the number of symbols being less than the first threshold and the number of unavailable symbols. In some examples, the overlap ratio manager 1140 may transmit an indication of the first threshold for the number of symbols. In some examples, the overlap ratio manager 1140 may determine that the number of symbols configured for reference signal transmissions satisfies a first threshold. In some examples, the overlap ratio manager 1140 may determine that the number of unavailable symbols is less than a second threshold. In some examples, the overlap ratio manager 1140 may determine that the reference signal transmissions in the corresponding resource overlap are omitted based on the number of symbols satisfying the first threshold and the number of unavailable symbols being less than the second threshold. In some examples, the overlap ratio manager 1140 may transmit an indication of the first threshold for the number of symbols and the second threshold for the unavailable symbols.

The SRS use manager 1145 may identify a use for the collection of reference signal transmissions, where the one or more transmission properties include the use for the collection of reference signal transmissions. In some examples, the SRS use manager 1145 may determine that the reference signal transmissions include positioning reference signal transmissions. In some examples, the SRS use manager 1145 may determine that transmission of the collection of reference signal transmissions is delayed based on the reference signal transmissions including positioning reference signal transmissions.

The resource overlap location manager 1150 may identify a location of the resource overlap within the collection of reference signal transmissions, where the one or more transmission properties include the location of the resource overlap within the collection of reference signal transmissions. In some examples, the resource overlap location manager 1150 may determine that the resource overlap occurs between a first set of symbols and a second set of symbols configured for reference signal transmissions. In some examples, the resource overlap location manager 1150 may determine that transmission of the collection of reference signal transmissions is delayed based on the resource overlap occurring between the first set of symbols and the second set of symbols.

In some examples, the resource overlap location manager 1150 may determine that the resource overlap occurs either during a beginning symbol or an ending symbol configured for reference signal transmissions. In some examples, the resource overlap location manager 1150 may determine that the reference signal transmissions in the corresponding resource overlap are omitted based on the resource overlap occurring either during the beginning symbol or the ending symbol.

The staggering configuration manager 1155 may identify a staggering configuration for the collection of reference signal transmissions, where the one or more transmission properties include the staggering configuration for the collection of reference signal transmissions. In some examples, the staggering configuration manager 1155 may determine that the collection of reference signal transmissions are configured for staggering transmissions. In some examples, the staggering configuration manager 1155 may determine that transmission of the collection of reference signal transmissions is delayed based on the staggering transmissions. In some examples, the staggering configuration manager 1155 may determine that the collection of reference signal transmissions are configured for non-staggering transmissions. In some examples, the staggering configuration manager 1155 may determine that the reference signal transmissions in the corresponding resource overlap are omitted based on the non-staggering transmissions.

The repetition configuration manager 1160 may identify a repetition configuration for the collection of reference signal transmissions, where the one or more transmission properties include the repetition configuration for the collection of reference signal transmissions. In some examples, the repetition configuration manager 1160 may determine that the collection of reference signal transmissions are configured for repetition transmissions across a set of slots. In some examples, the repetition configuration manager 1160 may determine that the reference signal transmissions in the corresponding resource overlap are omitted based on the repetition transmissions. In some examples, the repetition configuration manager 1160 may determine that the collection of reference signal transmissions are configured for non-repetition transmissions. In some examples, the repetition configuration manager 1160 may determine whether the reference signal transmissions in the corresponding resource overlap are omitted or the transmission of the collection of reference signal transmissions is delayed based on the non-repetition transmissions.

Figure 12:
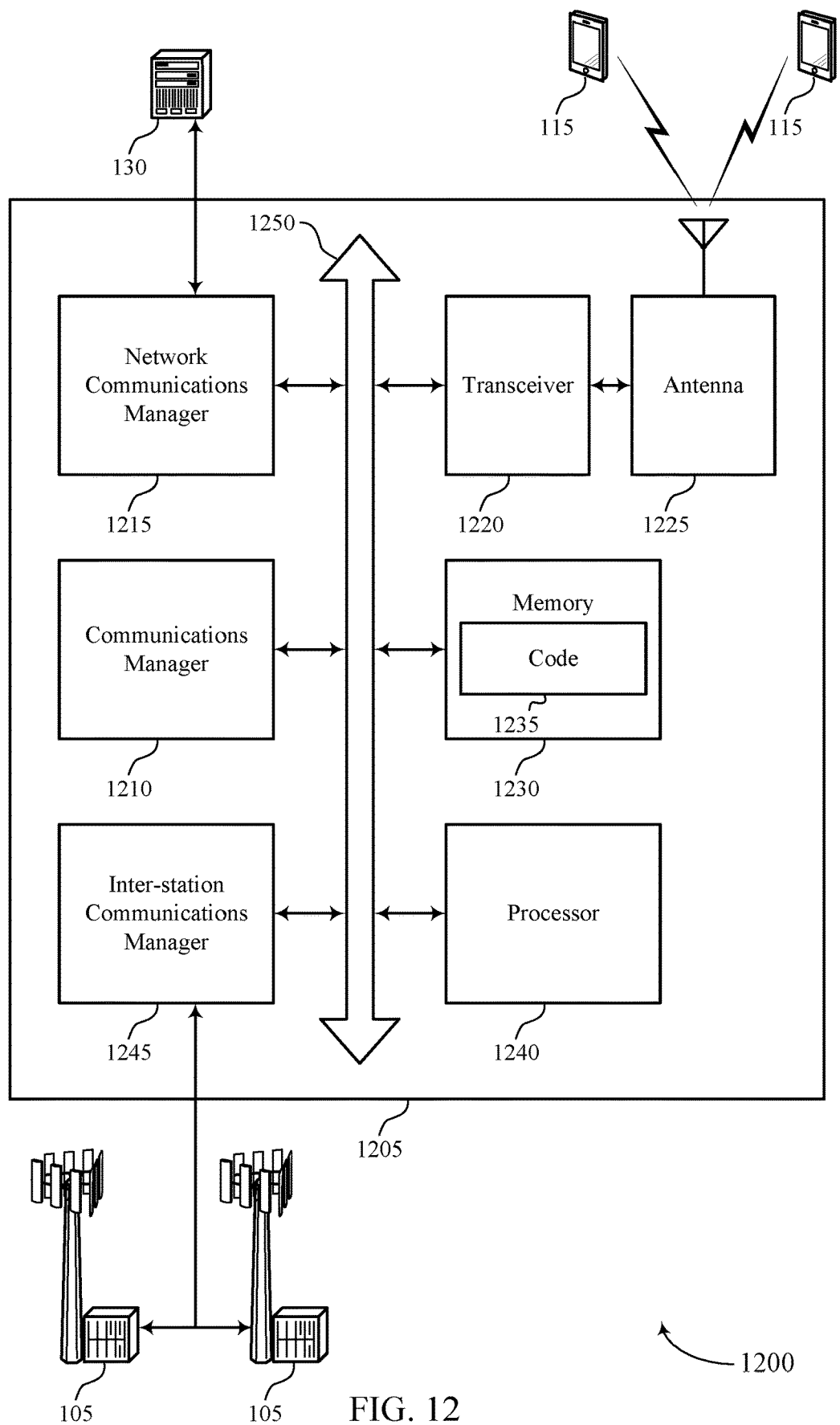
FIG. 12 shows a diagram of a system including a device that supports reference signal transmission omission and postponing in accordance with aspects of the present disclosure.

FIG. 12 shows a diagram of a system 1200 including a device 1205 that supports reference signal transmission omission and postponing in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a configuration signal configuring a collection of reference signal transmissions, identify a resource overlap between the collection of reference signal transmissions and another resource that is unavailable for reference signal transmissions, identify one or more transmission properties for the collection of reference signal transmissions, determine, based on the one or more transmission properties and the resource overlap, whether one or more of the reference signal transmissions of the collection of reference signal transmissions in the corresponding resource overlap are omitted or the transmission of the collection of reference signal transmissions is delayed, and receive at least a portion of the collection of reference signal transmissions based on the determining.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reference signal transmission omission and postponing).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
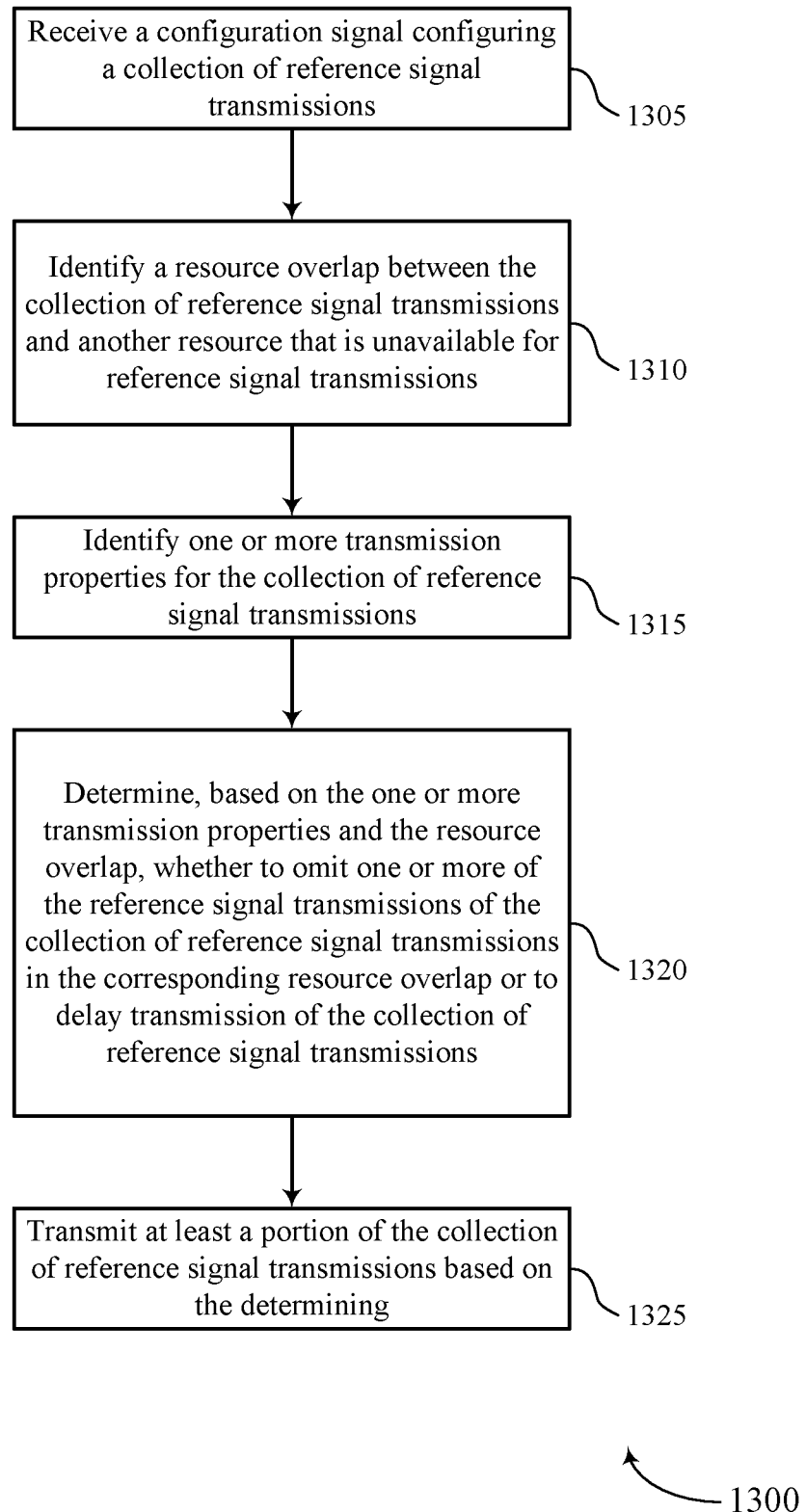
FIGS. 13 through 17 show flowcharts illustrating methods that support reference signal transmission omission and postponing in accordance with aspects of the present disclosure.

FIG. 13 shows a flowchart illustrating a method 1300 that supports reference signal transmission omission and postponing in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration signal configuring a collection of reference signal transmissions. The operations of 1305 may be performed according to the methods described herein. In some examples, aspects of the operations of 1305 may be performed by a configuration manager as described with reference to FIGS. 5 through 8.

At 1310, the UE may identify a resource overlap between the collection of reference signal transmissions and another resource that is unavailable for reference signal transmissions. The operations of 1310 may be performed according to the methods described herein. In some examples, aspects of the operations of 1310 may be performed by a resource overlap manager as described with reference to FIGS. 5 through 8.

At 1315, the UE may identify one or more transmission properties for the collection of reference signal transmissions. The operations of 1315 may be performed according to the methods described herein. In some examples, aspects of the operations of 1315 may be performed by a transmission property manager as described with reference to FIGS. 5 through 8.

At 1320, the UE may determine, based on the one or more transmission properties and the resource overlap, whether to omit one or more of the reference signal transmissions of the collection of reference signal transmissions in the corresponding resource overlap or to delay transmission of the collection of reference signal transmissions. The operations of 1320 may be performed according to the methods described herein. In some examples, aspects of the operations of 1320 may be performed by an omission/delay manager as described with reference to FIGS. 5 through 8.

At 1325, the UE may transmit at least a portion of the collection of reference signal transmissions based on the determining. The operations of 1325 may be performed according to the methods described herein. In some examples, aspects of the operations of 1325 may be performed by a RS transmission manager as described with reference to FIGS. 5 through 8.

Figure 14:
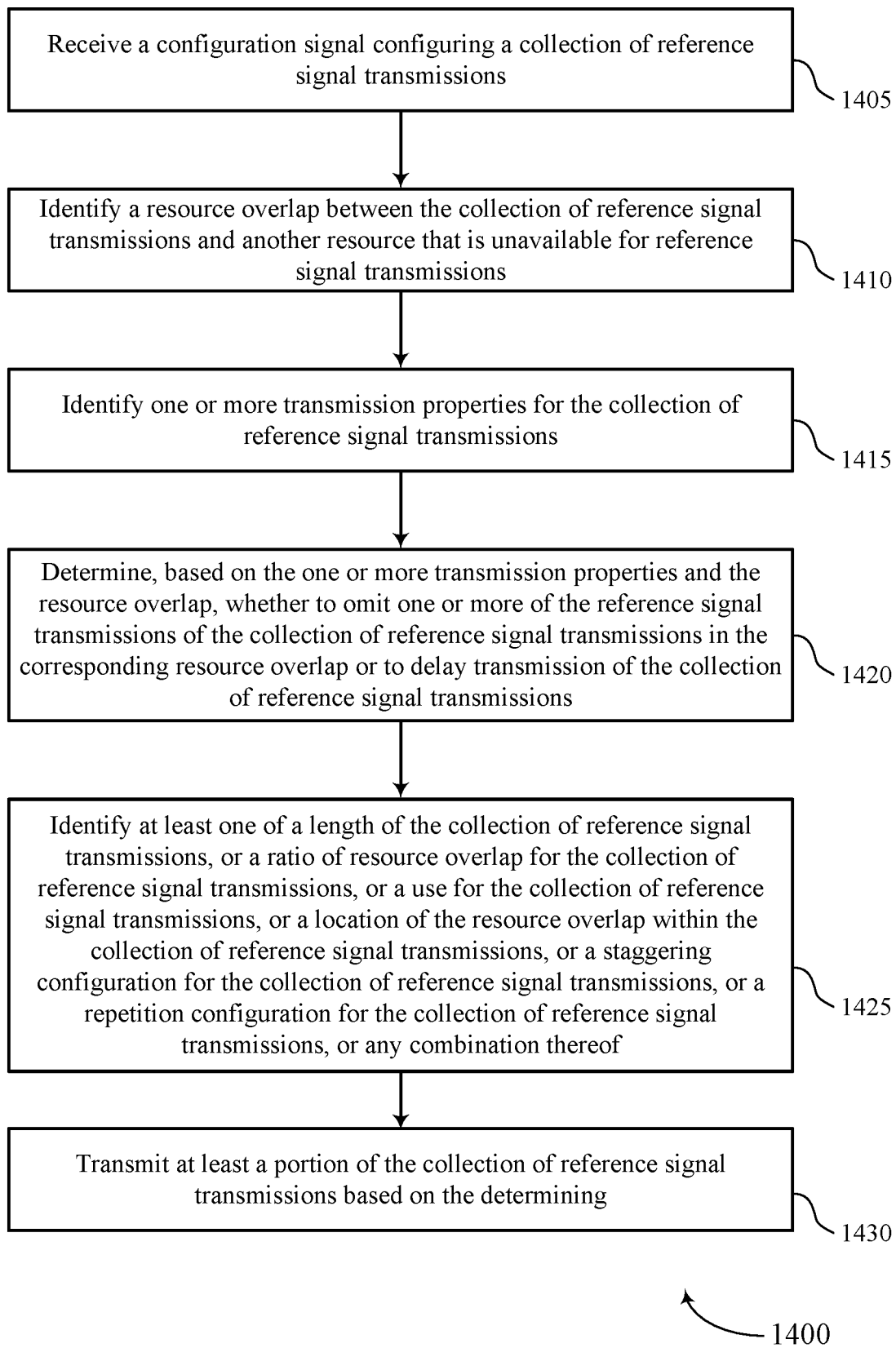

FIG. 14 shows a flowchart illustrating a method 1400 that supports reference signal transmission omission and postponing in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration signal configuring a collection of reference signal transmissions. The operations of 1405 may be performed according to the methods described herein. In some examples, aspects of the operations of 1405 may be performed by a configuration manager as described with reference to FIGS. 5 through 8.

At 1410, the UE may identify a resource overlap between the collection of reference signal transmissions and another resource that is unavailable for reference signal transmissions. The operations of 1410 may be performed according to the methods described herein. In some examples, aspects of the operations of 1410 may be performed by a resource overlap manager as described with reference to FIGS. 5 through 8.

At 1415, the UE may identify one or more transmission properties for the collection of reference signal transmissions. The operations of 1415 may be performed according to the methods described herein. In some examples, aspects of the operations of 1415 may be performed by a transmission property manager as described with reference to FIGS. 5 through 8.

At 1420, the UE may determine, based on the one or more transmission properties and the resource overlap, whether to omit one or more of the reference signal transmissions of the collection of reference signal transmissions in the corresponding resource overlap or to delay transmission of the collection of reference signal transmissions. The operations of 1420 may be performed according to the methods described herein. In some examples, aspects of the operations of 1420 may be performed by an omission/delay manager as described with reference to FIGS. 5 through 8.

At 1425, the UE may identify at least one of a length of the collection of reference signal transmissions, or a ratio of resource overlap for the collection of reference signal transmissions, or a use for the collection of reference signal transmissions, or a location of the resource overlap within the collection of reference signal transmissions, or a staggering configuration for the collection of reference signal transmissions, or a repetition configuration for the collection of reference signal transmissions, or any combination thereof. The operations of 1425 may be performed according to the methods described herein. In some examples, aspects of the operations of 1425 may be performed by a RS transmission manager as described with reference to FIGS. 5 through 8.

At 1430, the UE may transmit at least a portion of the collection of reference signal transmissions based on the determining. The operations of 1430 may be performed according to the methods described herein. In some examples, aspects of the operations of 1430 may be performed by a transmission property manager as described with reference to FIGS. 5 through 8.

Figure 15:
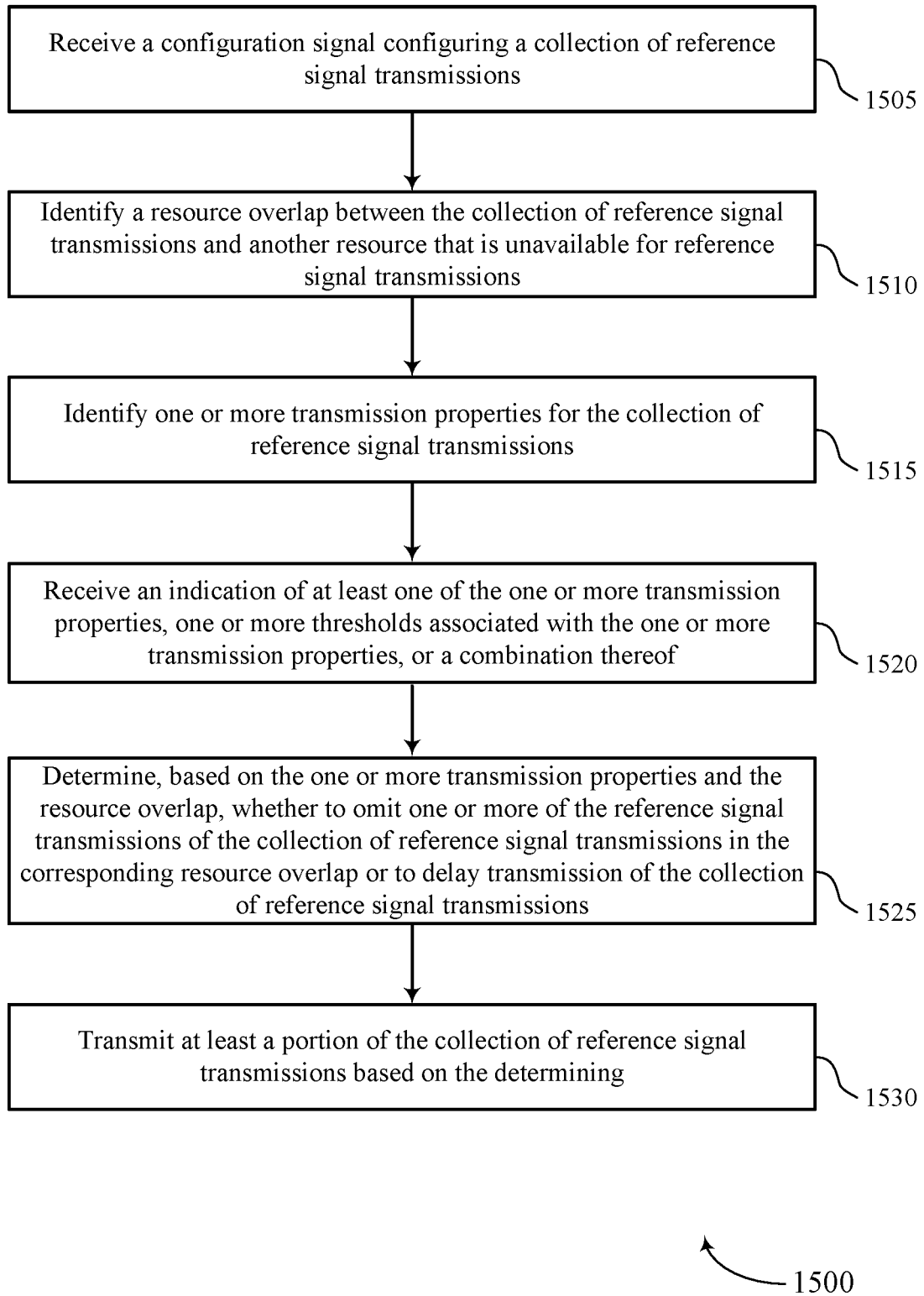

FIG. 15 shows a flowchart illustrating a method 1500 that supports reference signal transmission omission and postponing in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration signal configuring a collection of reference signal transmissions. The operations of 1505 may be performed according to the methods described herein. In some examples, aspects of the operations of 1505 may be performed by a configuration manager as described with reference to FIGS. 5 through 8.

At 1510, the UE may identify a resource overlap between the collection of reference signal transmissions and another resource that is unavailable for reference signal transmissions. The operations of 1510 may be performed according to the methods described herein. In some examples, aspects of the operations of 1510 may be performed by a resource overlap manager as described with reference to FIGS. 5 through 8.

At 1515, the UE may identify one or more transmission properties for the collection of reference signal transmissions. The operations of 1515 may be performed according to the methods described herein. In some examples, aspects of the operations of 1515 may be performed by a transmission property manager as described with reference to FIGS. 5 through 8.

At 1520, the UE may receive an indication of at least one of the one or more transmission properties, one or more thresholds associated with the one or more transmission properties, or a combination thereof. The operations of 1520 may be performed according to the methods described herein. In some examples, aspects of the operations of 1520 may be performed by an omission/delay manager as described with reference to FIGS. 5 through 8.

At 1525, the UE may determine, based on the one or more transmission properties and the resource overlap, whether to omit one or more of the reference signal transmissions of the collection of reference signal transmissions in the corresponding resource overlap or to delay transmission of the collection of reference signal transmissions. The operations of 1525 may be performed according to the methods described herein. In some examples, aspects of the operations of 1525 may be performed by a RS transmission manager as described with reference to FIGS. 5 through 8.

At 1530, the UE may transmit at least a portion of the collection of reference signal transmissions based on the determining. The operations of 1530 may be performed according to the methods described herein. In some examples, aspects of the operations of 1530 may be performed by a transmission property manager as described with reference to FIGS. 5 through 8.

Figure 16:
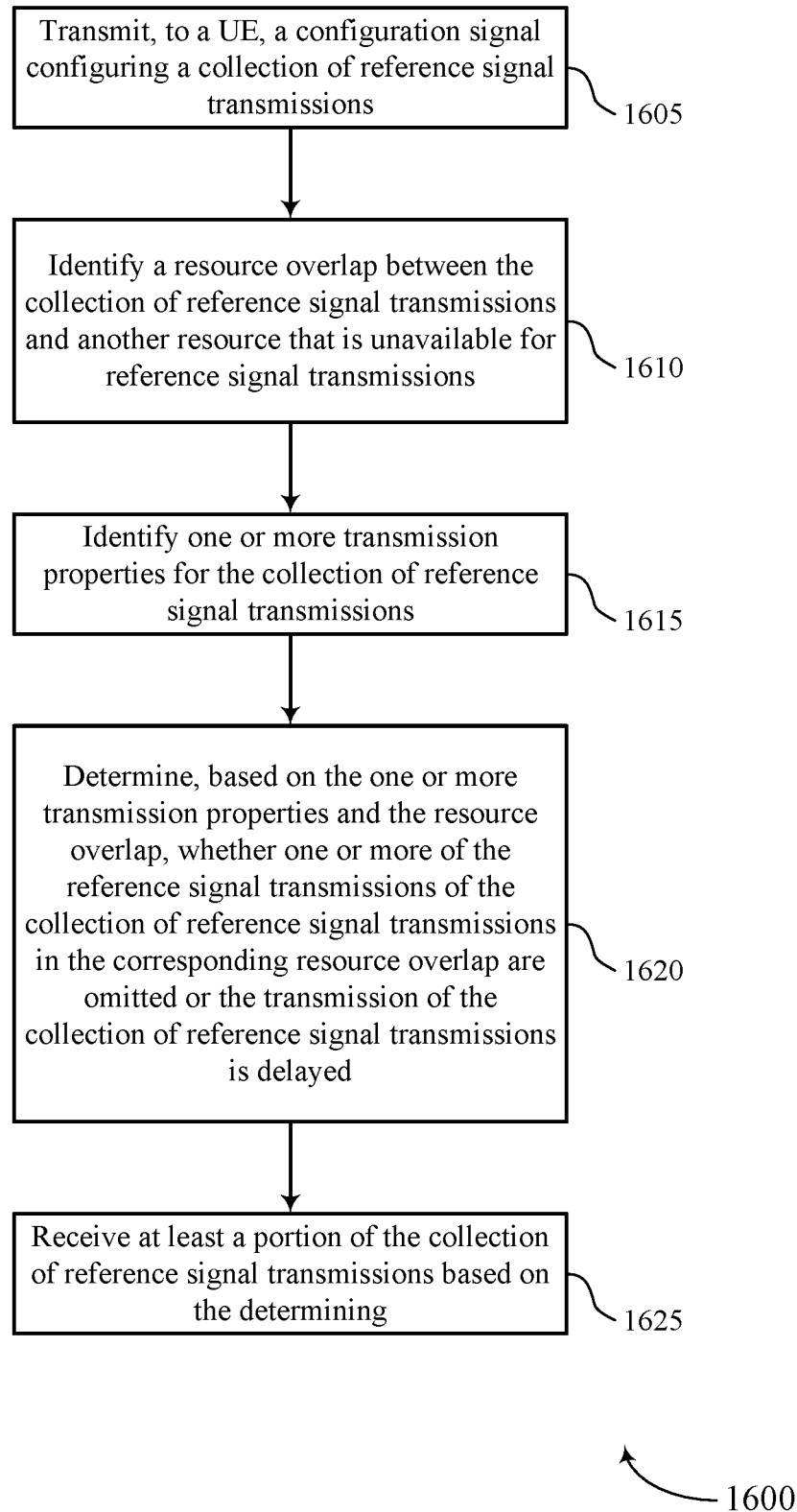

FIG. 16 shows a flowchart illustrating a method 1600 that supports reference signal transmission omission and postponing in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration signal configuring a collection of reference signal transmissions. The operations of 1605 may be performed according to the methods described herein. In some examples, aspects of the operations of 1605 may be performed by a configuration manager as described with reference to FIGS. 9 through 12.

At 1610, the base station may identify a resource overlap between the collection of reference signal transmissions and another resource that is unavailable for reference signal transmissions. The operations of 1610 may be performed according to the methods described herein. In some examples, aspects of the operations of 1610 may be performed by a resource overlap manager as described with reference to FIGS. 9 through 12.

At 1615, the base station may identify one or more transmission properties for the collection of reference signal transmissions. The operations of 1615 may be performed according to the methods described herein. In some examples, aspects of the operations of 1615 may be performed by a transmission property manager as described with reference to FIGS. 9 through 12.

At 1620, the base station may determine, based on the one or more transmission properties and the resource overlap, whether one or more of the reference signal transmissions of the collection of reference signal transmissions in the corresponding resource overlap are omitted or the transmission of the collection of reference signal transmissions is delayed. The operations of 1620 may be performed according to the methods described herein. In some examples, aspects of the operations of 1620 may be performed by an omission/delay manager as described with reference to FIGS. 9 through 12.

At 1625, the base station may receive at least a portion of the collection of reference signal transmissions based on the determining. The operations of 1625 may be performed according to the methods described herein. In some examples, aspects of the operations of 1625 may be performed by a RS transmission manager as described with reference to FIGS. 9 through 12.

Figure 17:
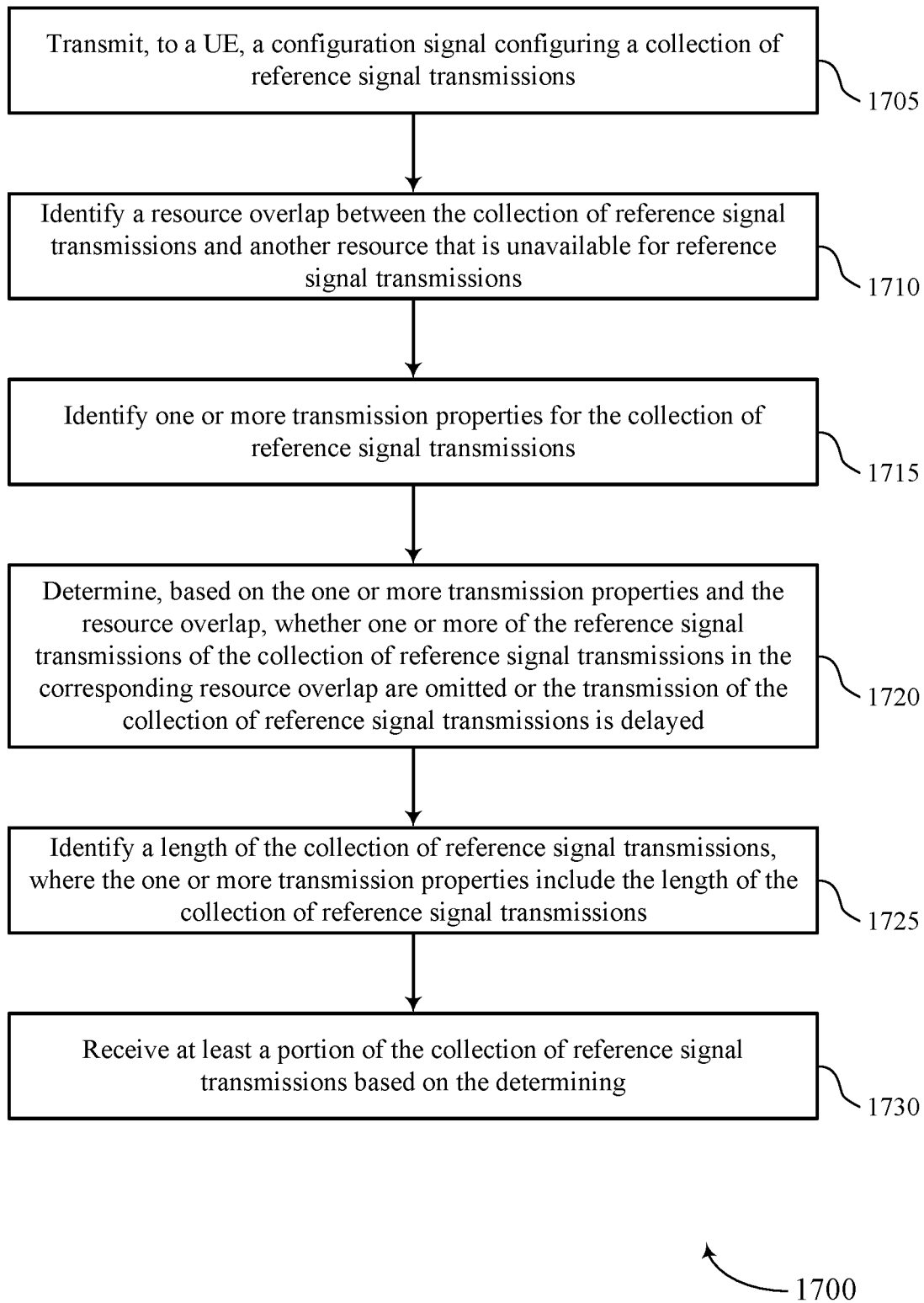

FIG. 17 shows a flowchart illustrating a method 1700 that supports reference signal transmission omission and postponing in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration signal configuring a collection of reference signal transmissions. The operations of 1705 may be performed according to the methods described herein. In some examples, aspects of the operations of 1705 may be performed by a configuration manager as described with reference to FIGS. 9 through 12.

At 1710, the base station may identify a resource overlap between the collection of reference signal transmissions and another resource that is unavailable for reference signal transmissions. The operations of 1710 may be performed according to the methods described herein. In some examples, aspects of the operations of 1710 may be performed by a resource overlap manager as described with reference to FIGS. 9 through 12.

At 1715, the base station may identify one or more transmission properties for the collection of reference signal transmissions. The operations of 1715 may be performed according to the methods described herein. In some examples, aspects of the operations of 1715 may be performed by a transmission property manager as described with reference to FIGS. 9 through 12.

At 1720, the base station may determine, based on the one or more transmission properties and the resource overlap, whether one or more of the reference signal transmissions of the collection of reference signal transmissions in the corresponding resource overlap are omitted or the transmission of the collection of reference signal transmissions is delayed. The operations of 1720 may be performed according to the methods described herein. In some examples, aspects of the operations of 1720 may be performed by an omission/delay manager as described with reference to FIGS. 9 through 12.

At 1725, the base station may identify a length of the collection of reference signal transmissions, where the one or more transmission properties include the length of the collection of reference signal transmissions. The operations of 1725 may be performed according to the methods described herein. In some examples, aspects of the operations of 1725 may be performed by a RS transmission manager as described with reference to FIGS. 9 through 12.

At 1730, the base station may receive at least a portion of the collection of reference signal transmissions based on the determining. The operations of 1730 may be performed according to the methods described herein. In some examples, aspects of the operations of 1730 may be performed by a SRS length manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration signal configuring a collection of reference signal transmissions;
   identifying a resource overlap between the collection of reference signal transmissions and another resource that is unavailable for reference signal transmissions;
   identifying one or more transmission properties for the collection of reference signal transmissions, wherein the one or more transmission properties comprise a use for the collection of reference signal transmissions;
   determining, based at least in part on the one or more transmission properties and the resource overlap, whether to delay transmission of the collection of reference signal transmissions; and
   transmitting at least a portion of the collection of reference signal transmissions based at least in part on the determining.

2. The method of claim 1, further comprising:
   identifying a length of the collection of reference signal transmissions, wherein the one or more transmission properties comprise the length of the collection of reference signal transmissions.

3. The method of claim 2, wherein identifying the length of the collection of reference signal transmissions comprise:
   identifying, based at least in part on the configuration signal, a number of symbols configured for reference signal transmissions;
   determining that the number of symbols configured for reference signal transmissions is less than a threshold; and
   determining to delay transmission of the collection of reference signal transmissions based at least in part on the number of symbols being less than the threshold.

4. The method of claim 2, further comprising:
receiving an indication of the threshold for the number of symbols.

5. The method of claim 1, further comprising:
identifying a ratio of a first length of the resource overlap over a second length of the collection of reference signal transmissions, wherein the one or more transmission properties comprise the ratio of resource overlap.

6. The method of claim 5, wherein identifying the ratio of resource overlap comprise:
identifying, based at least in part on the configuration signal, a number of symbols configured for reference signal transmissions, wherein the number of symbols comprise the second length; and
identifying, based at least in part on the resource overlap, a number of unavailable symbols within the symbols configured for reference signal transmissions, wherein the number of unavailable symbols comprise the first length.

7. The method of claim 6, further comprising:
determining that the number of symbols configured for reference signal transmissions is less than a first threshold; and
determining to delay transmission of the collection of reference signal transmissions based at least in part on the number of symbols being less than the first threshold and the number of unavailable symbols.

8. The method of claim 7, further comprising:
receiving an indication of the first threshold for the number of symbols.

9. The method of claim 6, further comprising:
determining that the number of symbols configured for reference signal transmissions satisfies a first threshold;
determining that the number of unavailable symbols is less than a second threshold; and
determining to omit the reference signal transmissions in the corresponding resource overlap based at least in part on the number of symbols satisfying the first threshold and the number of unavailable symbols being less than the second threshold.

10. The method of claim 9, further comprising:
receiving an indication of the first threshold for the number of symbols and the second threshold for the unavailable symbols.

11. The method of claim 1, further comprising:
identifying the use for the collection of reference signal transmissions.

12. The method of claim 11, wherein identifying the use for the collection of reference signals comprise:
determining that the reference signal transmissions comprise positioning reference signal transmissions; and
determining to delay transmission of the collection of reference signal transmissions based at least in part on the reference signal transmissions comprising positioning reference signal transmissions.

13. The method of claim 1, further comprising:
identifying a location of the resource overlap within the collection of reference signal transmissions, wherein the one or more transmission properties comprise the location of the resource overlap within the collection of reference signal transmissions.

14. The method of claim 13, wherein identifying the location of the resource overlap comprises:
determining that the resource overlap occurs between a first set of symbols and a second set of symbols configured for reference signal transmissions; and
determining to delay transmission of the collection of reference signal transmissions based at least in part on the resource overlap occurring between the first set of symbols and the second set of symbols.

15. The method of claim 13, wherein identifying the location of the resource overlap comprises:
determining that the resource overlap occurs either during a beginning symbol or an ending symbol configured for reference signal transmissions; and
determining to omit the reference signal transmissions in the corresponding resource overlap based at least in part on the resource overlap occurring either during the beginning symbol or the ending symbol.

16. The method of claim 1, further comprising:
identifying a staggering configuration for the collection of reference signal transmissions, wherein the one or more transmission properties comprise the staggering configuration for the collection of reference signal transmissions.

17. The method of claim 16, wherein identifying the staggering configuration comprises:
determining that the collection of reference signal transmissions are configured for staggering transmissions; and
determining to delay transmission of the collection of reference signal transmissions based at least in part on the staggering transmissions.

18. The method of claim 16, wherein identifying the staggering configuration comprises:
determining that the collection of reference signal transmissions are configured for non-staggering transmissions; and
determining to omit the reference signal transmissions in the corresponding resource overlap based at least in part on the non-staggering transmissions.

19. The method of claim 1, further comprising:
identifying a repetition configuration for the collection of reference signal transmissions, wherein the one or more transmission properties comprise the repetition configuration for the collection of reference signal transmissions.

20. The method of claim 19, wherein identifying the repetition configuration comprises:
determining that the collection of reference signal transmissions are configured for repetition transmissions across a plurality of slots; and
determining to omit the reference signal transmissions in the corresponding resource overlap based at least in part on the repetition transmissions.

21. The method of claim 19, wherein identifying the repetition configuration comprises:
determining that the collection of reference signal transmissions are configured for non-repetition transmissions; and
determining whether to omit the reference signal transmissions in the corresponding resource overlap or to delay transmission of the collection of reference signal transmissions based at least in part on the non-repetition transmissions.

22. The method of claim 1, wherein identifying one or more transmission properties comprises:
identifying at least one of a length of the collection of reference signal transmissions, or a ratio of resource overlap for the collection of reference signal transmissions, or a use for the collection of reference signal transmissions, or a location of the resource overlap within the collection of reference signal transmissions, or a staggering configuration for the collection of reference signal transmissions, or a repetition configuration for the collection of reference signal transmissions, or any combination thereof.

23. The method of claim 1, further comprising:
receiving an indication of at least one of the one or more transmission properties, one or more thresholds associated with the one or more transmission properties, or a combination thereof.

24. The method of claim 1, wherein the collection of reference signal transmissions comprise a sounding reference signal (SRS) resource having a repetition factor of R, where R comprises a number of reference signal transmissions within consecutive symbols.

25. A method for wireless communication at a base station, comprising:
transmitting, to a user equipment (UE), a configuration signal configuring a collection of reference signal transmissions;
identifying a resource overlap between the collection of reference signal transmissions and another resource that is unavailable for reference signal transmissions;
identifying one or more transmission properties for the collection of reference signal transmissions, wherein the one or more transmission properties comprise a use for the collection of reference signal transmissions;
determining, based at least in part on the one or more transmission properties and the resource overlap, whether the transmission of the collection of reference signal transmissions is delayed; and
receiving at least a portion of the collection of reference signal transmissions based at least in part on the determining.

26. An apparatus for wireless communication at a user equipment (UE), comprising:
a processor,
memory coupled with the processor; and
instructions stored in the memory and executable by the processor to cause the apparatus to:
receive a configuration signal configuring a collection of reference signal transmissions;
identify a resource overlap between the collection of reference signal transmissions and another resource that is unavailable for reference signal transmissions;
identify one or more transmission properties for the collection of reference signal transmissions, wherein the one or more transmission properties comprise a use for the collection of reference signal transmissions;
determine, based at least in part on the one or more transmission properties and the resource overlap, whether to delay transmission of the collection of reference signal transmissions; and
transmit at least a portion of the collection of reference signal transmissions based at least in part on the determining.

27. The apparatus of claim 26, wherein the instructions are further executable by the processor to cause the apparatus to:
identify a length of the collection of reference signal transmissions, wherein the one or more transmission properties comprise the length of the collection of reference signal transmissions.

28. The apparatus of claim 26, wherein the instructions are further executable by the processor to cause the apparatus to:
identify a ratio of a first length of the resource overlap over a second length of the collection of reference signal transmissions, wherein the one or more transmission properties comprise the ratio of resource overlap.

29. The apparatus of claim 26, wherein the instructions are further executable by the processor to cause the apparatus to:
identify the use for the collection of reference signal transmissions.

30. The apparatus of claim 26, wherein the instructions are further executable by the processor to cause the apparatus to:
identify a location of the resource overlap within the collection of reference signal transmissions, wherein the one or more transmission properties comprise the location of the resource overlap within the collection of reference signal transmissions.

31. The apparatus of claim 26, wherein the instructions are further executable by the processor to cause the apparatus to:
identify a staggering configuration for the collection of reference signal transmissions, wherein the one or more transmission properties comprise the staggering configuration for the collection of reference signal transmissions.

32. The apparatus of claim 26, wherein the instructions are further executable by the processor to cause the apparatus to:
identify a repetition configuration for the collection of reference signal transmissions, wherein the one or more transmission properties comprise the repetition configuration for the collection of reference signal transmissions.

33. The apparatus of claim 26, wherein the instructions to identify one or more transmission properties are executable by the processor to cause the apparatus to:
identify at least one of a length of the collection of reference signal transmissions, or a ratio of resource overlap for the collection of reference signal transmissions, or a use for the collection of reference signal transmissions, or a location of the resource overlap within the collection of reference signal transmissions, or a staggering configuration for the collection of reference signal transmissions, or a repetition configuration for the collection of reference signal transmissions, or any combination thereof.

34. The apparatus of claim 26, wherein the instructions are further executable by the processor to cause the apparatus to:
receive an indication of at least one of the one or more transmission properties, one or more thresholds associated with the one or more transmission properties, or a combination thereof.

35. The apparatus of claim 26, wherein the collection of reference signal transmissions comprise a sounding reference signal (SRS) resource having a repetition factor of R, where R comprises a number of reference signal transmissions within consecutive symbols.

* * * * *